US010820141B2

(12) United States Patent
Beaurepaire et al.

(10) Patent No.: US 10,820,141 B2
(45) Date of Patent: Oct. 27, 2020

(54) METHOD AND APPARATUS FOR PRESENTING PRIVACY-RESPECTFUL AND PERSONALIZED LOCATION-BASED COMMENTS BASED ON PASSENGER CONTEXT AND VEHICLE PROXIMITY TO THE LOCATION

(71) Applicant: HERE GLOBAL B.V., Eindhoven (NL)

(72) Inventors: Jerome Beaurepaire, Berlin (DE); Wiebke Hurrelmann-Wieding, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 16/193,891

(22) Filed: Nov. 16, 2018

(65) Prior Publication Data

US 2020/0162836 A1   May 21, 2020

(51) Int. Cl.
*H04W 4/021* (2018.01)
*G06F 16/9537* (2019.01)
(Continued)

(52) U.S. Cl.
CPC ........ *H04W 4/021* (2013.01); *G06F 16/9537* (2019.01); *G06F 21/6245* (2013.01); *H04W 4/44* (2018.02); *H04W 12/02* (2013.01)

(58) Field of Classification Search
CPC ............. G06K 9/3258; G06K 9/00671; G06K 9/00362; G06K 9/0063; G06K 9/00832; G06K 9/3233; G06F 16/2379; G06F 16/29; G06F 3/04842; G06F 3/0481; G06F 9/451; G06F 16/24575; G06F 16/583;
(Continued)

(56) References Cited

U.S. PATENT DOCUMENTS 8,875,219 B2   10/2014   Wilson
2011/0270517 A1   11/2011   Benedetti
(Continued)

FOREIGN PATENT DOCUMENTS

KR   20120032290 A   4/2012

OTHER PUBLICATIONS

Reminiscing through location-based asynchronous video communication by Bentley et al., dated May 7, 2011 (Year: 2011).*
(Continued)

*Primary Examiner* — Daniel Lai
(74) *Attorney, Agent, or Firm* — Ditthavong & Steiner, P.C.

(57) ABSTRACT

An approach is provided for presenting privacy-respectful and personalized location-based comments based on passenger context and vehicle proximity to the location. The approach involves identifying a user, a location, and/or a context of a vehicle. The approach also involves determining a privacy level set by the user and/or associated with the context. The approach further involves generating a personalized comment related to the location based on the privacy level, wherein the personalized comment includes privacy-sensitive data associated with the user. The approach further involves triggering a presentation of the personalized comment in a user interface of the vehicle and/or a device based on a proximity of the vehicle to the location.

20 Claims, 11 Drawing Sheets

500

"IN 100M, YOU WILL ARRIVE AT THE PLACE WHERE YOU FRIEND JOE PROPOSED HIS WIFE AFTER 8 YEARS TOGETHER IN 2009, CLICK HERE TO VIEW THE RELATED PHOTOS AND COMMENTS ON SOCIAL MEDIA."

— 501
—505

— 503

(51) Int. Cl.
*H04W 4/44* (2018.01)
*G06F 21/62* (2013.01)
*H04W 12/02* (2009.01)

(58) Field of Classification Search
CPC ...... G06F 16/61; G06F 16/639; G06F 16/951;
G06F 16/9566; G06F 1/3206; G06F
21/604; G06F 21/6245; G06F 16/9537;
H04W 4/21; H04W 4/02; H04W 4/021;
H04W 4/029; H04W 12/02; H04W 4/023;
H04W 4/40; H04W 4/046; H04W 4/44;
H04W 4/60; H04W 4/04; H04W 4/12;
H04W 4/46; G06Q 30/0277; G06Q
50/01; G06Q 30/0265
See application file for complete search history.

(56) References Cited

U.S. PATENT DOCUMENTS

| | | |
|---|---|---|
| 2012/0054035 A1 | 3/2012 | Nam et al. |
| 2013/0006748 A1* | 1/2013 | Horvitz .................. G06Q 30/02 705/14.39 |
| 2013/0339440 A1* | 12/2013 | Balassanian .......... H04L 67/306 709/204 |
| 2013/0340086 A1 | 12/2013 | Blom |
| 2014/0309806 A1 | 10/2014 | Ricci |
| 2015/0032424 A1* | 1/2015 | Gupta .................... G01C 21/00 703/2 |
| 2015/0319224 A1* | 11/2015 | Rong .................... G06Q 30/02 709/217 |
| 2015/0339593 A1 | 11/2015 | Hakeem |
| 2015/0373416 A9* | 12/2015 | Cox .................... H04N 5/44543 725/46 |
| 2016/0335333 A1* | 11/2016 | Desineni ............. G06F 16/1748 |
| 2017/0126680 A1* | 5/2017 | Yusuf .................... H04W 12/02 |
| 2017/0293857 A1* | 10/2017 | Stajner ..................... G06N 5/04 |
| 2018/0349639 A1* | 12/2018 | Ohsaki ................ G06F 21/6245 |

OTHER PUBLICATIONS

Facebook Memories [online], [archived on Jan. 14, 2017], Retrieved from the Internet: <URL: https://web.archive.org/web/20170114134015/ https://play.google.com/store/apps/details?id=com.story8.android. gallery> (Year: 2017).*

Memoir, A "Google Now" for Photo Memories, Is an App That Helps You Remember the Past [online] by Perez, Sep. 18, 2013 and archived on Jun. 8, 2017 (see URL in Final Rejection, p. 21) (Year: 2017).*

Dictionary definition of "followed" from URL: https://www.merriam-webster.com/dictionary/followed, retrieved on Feb. 3, 2020 (Year: 2020).*

Office Action for related European Patent Application No. 19209241. 9-1213, dated Apr. 1, 2020, 8 pages.

\* cited by examiner

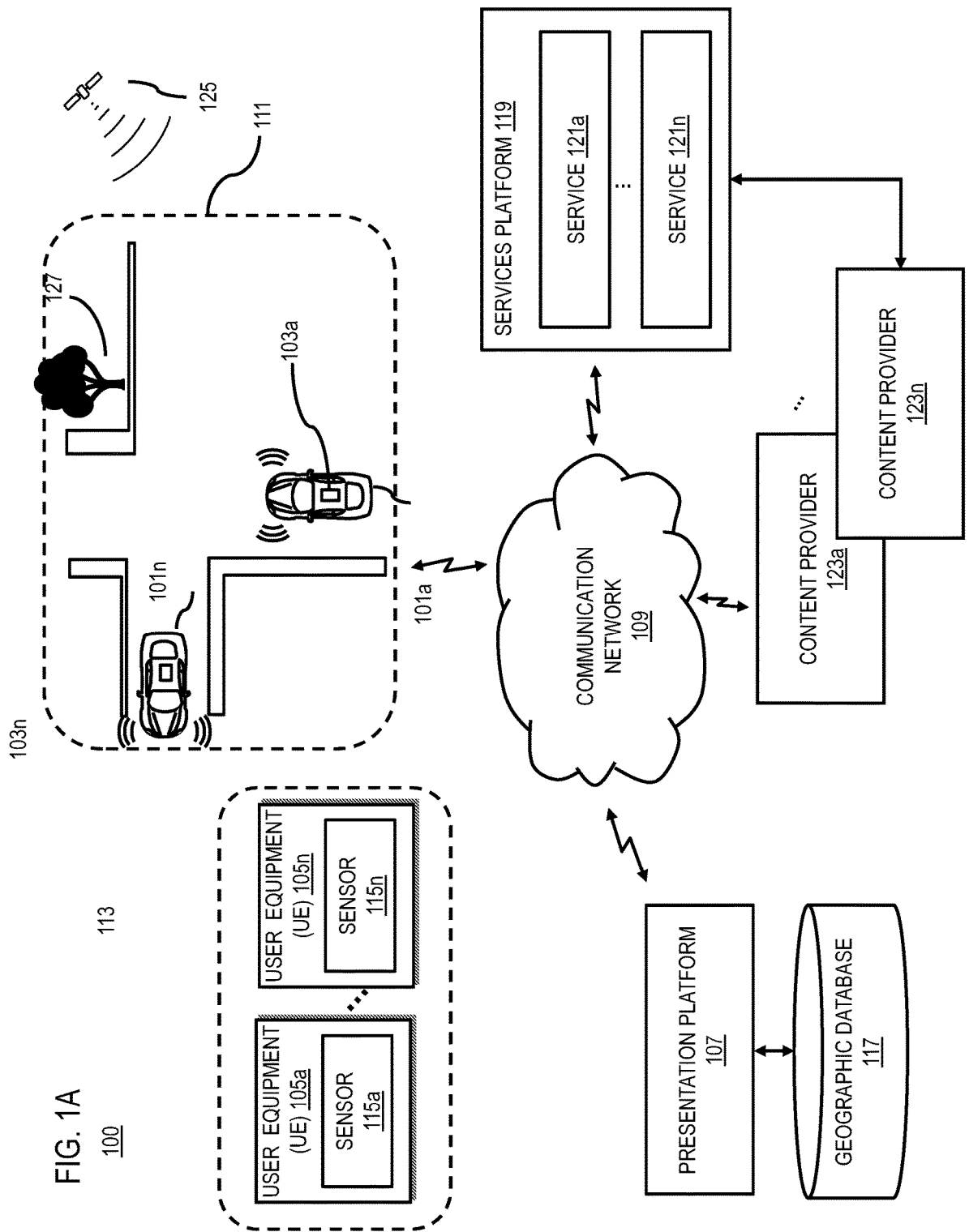

METHOD AND APPARATUS FOR PRESENTING PRIVACY-RESPECTFUL AND PERSONALIZED LOCATION-BASED COMMENTS BASED ON PASSENGER CONTEXT AND VEHICLE PROXIMITY TO THE LOCATION

BACKGROUND

Autonomous vehicles are able to operate by using pattern based learning and by processing data from sensors and other sources to support logical decision making (i.e., calculating the probabilities of various scenarios and upcoming vehicle events). Passengers of such vehicles demand relevant content during the ride. For example, one traditional approach to making services and/or related content more compelling is to provide location-based content when approaching the location, e.g., points of interest recommendations, etc. However, such content is usually static and non-personal. Accordingly, service providers and device manufacturers face significant technical challenges to provide highly relevant and personalized content while protecting the user's privacy where the personalized content can be exposed to other passengers.

SOME EXAMPLE EMBODIMENTS

As a result, there is a need for presenting privacy-respectful and personalized location-based comments based on passenger context and vehicle proximity to the location.

According to one embodiment, a computer-implemented method comprises identifying a user of a vehicle, a location of the vehicle, a context of the vehicle, or a combination thereof. The method also comprises determining a privacy level set by the user, associated with the context, or a combination thereof. The method further comprises providing data for generating a personalized comment related to the location based on the privacy level, wherein the personalized comment includes privacy-sensitive data associated with the user. The method further comprises triggering a presentation of the personalized comment in a user interface of the vehicle, a device, or a combination thereof based on a proximity of the vehicle to the location.

According to another embodiment, an apparatus comprises at least one processor, and at least one memory including computer program code for one or more computer programs, the at least one memory and the computer program code configured to, with the at least one processor, cause, at least in part, the apparatus to identify a user of a vehicle, a location of the vehicle, a context of the vehicle, or a combination thereof. The apparatus is also caused to determine a privacy level set by the user, associated with the context, or a combination thereof. The apparatus is further caused to generate a personalized comment related to the location based on the privacy level, wherein the personalized comment includes privacy-sensitive data associated with the user. The apparatus is also caused to trigger a presentation of the personalized comment in a user interface of the vehicle, a device, or a combination thereof based on a proximity of the vehicle to the location.

According to another embodiment, a non-transitory computer-readable storage medium carries one or more sequences of one or more instructions which, when executed by one or more processors, cause, at least in part, an apparatus to identify a user of a vehicle, a location of the vehicle, a context of the vehicle, or a combination thereof. The apparatus is also caused to determine a privacy level set by the user, associated with the context, or a combination thereof. The apparatus is further caused to generate a personalized comment related to the location based on the privacy level, wherein the personalized comment includes privacy-sensitive data associated with the user. The apparatus is further caused to trigger a presentation of the personalized comment in a user interface of the vehicle, a device, or a combination thereof based on a proximity of the vehicle to the location.

According to another embodiment, an apparatus comprises means for identifying a user of a vehicle, a location of the vehicle, a context of the vehicle, or a combination thereof. The apparatus also comprises means for determining a privacy level set by the user, associated with the context, or a combination thereof. The apparatus further comprises means for providing data for generating a personalized comment related to the location based on the privacy level, wherein the personalized comment includes privacy-sensitive data associated with the user. The apparatus further comprises means for triggering a presentation of the personalized comment in a user interface of the vehicle, a device, or a combination thereof based on a proximity of the vehicle to the location.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is a diagram of a system capable of presenting privacy-respectful and personalized location-based comments based on passenger context and vehicle proximity to the location, according to one embodiment;

DESCRIPTION OF SOME EMBODIMENTS

Figure 1B:
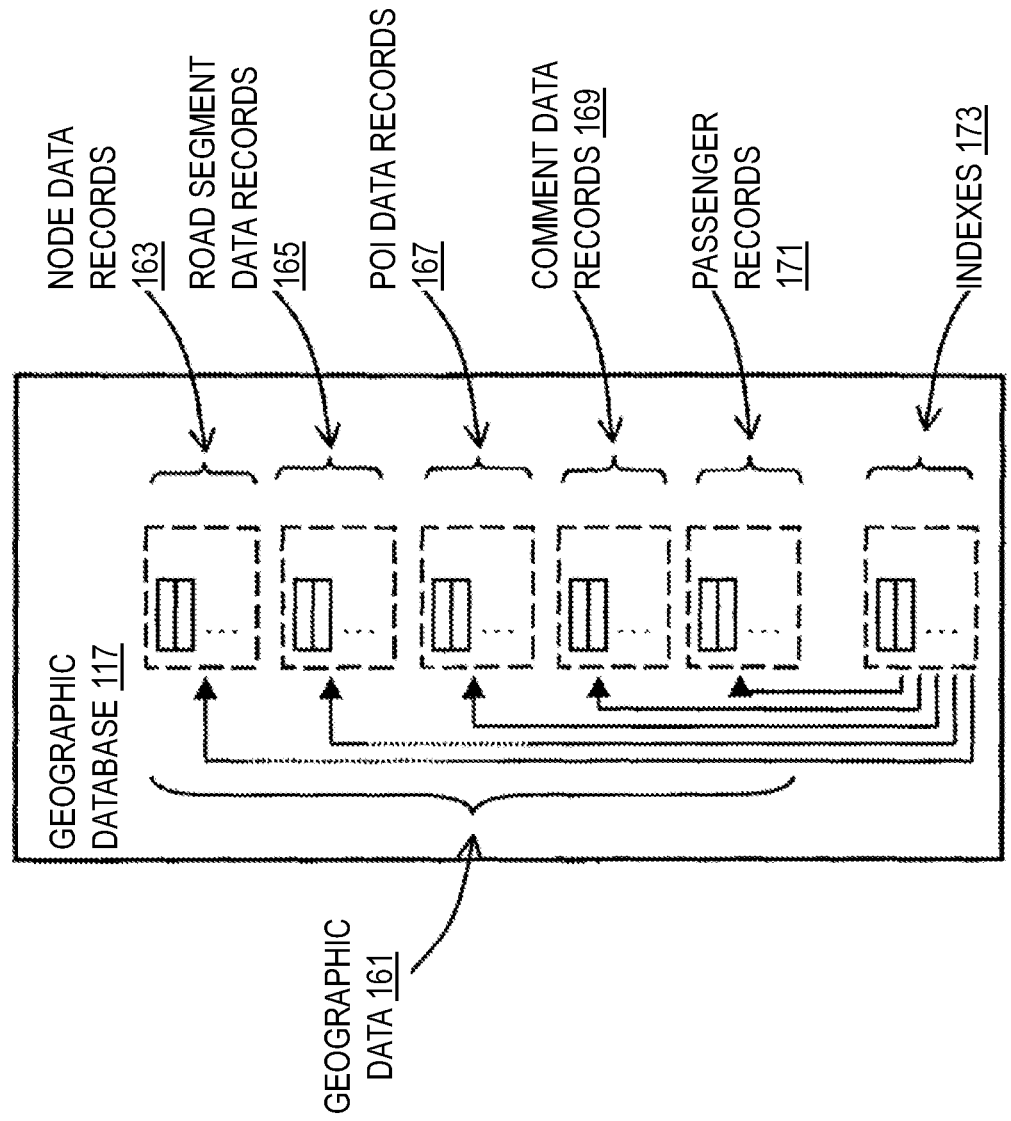
FIG. 1B is a diagram of a geographic database of the system of FIG. 1A, according to one embodiment.

Examples of a method, apparatus, and computer program for presenting privacy-respectful and personalized location-based comments based on passenger context and vehicle proximity to the location are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is a diagram of a system capable of presenting privacy-respectful and personalized location-based comments based on passenger context and vehicle (e.g., an autonomous or semi-autonomous car) proximity to the location, according to one embodiment. As noted above, service providers and device manufacturers are increasingly using highly relevant and/or personalized content to provide better service and/or increase user engagement with their respective services, content, and/or devices. Such personalized content can also potentially cause privacy concerns for a user, particularly when the personalized content is presented in a vehicle and can be heard, seen, or otherwise accessed by other passengers.

Personalized content can be any content generated that considers or uses previously collected personal data (e.g., profile information, interaction history, context, etc.). By way of example, the General Data Protection Regulation ("GDPR") covers data protection and privacy for all individuals within the European Union (EU) and the European Economic Area (EEA). It also addresses the export of personal data outside the EU and EEA areas. GDPR defines 'personal data' as any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person. On the other hand, the definition of personal data in USA is not uniform across states and regulations. In one embodiment, personal data or privacy-sensitive data associated with a user includes any information that relates to an identifiable individual.

However, personalized content is derived from user data, other people or users who also apprehend the personalized content may receive or infer the underlying user data, thereby creating potential privacy concerns when such data is exposed to other users in the same vehicle.

To address these technical problems, a system 100 of FIG. 1A introduces a capability to present privacy-respectful and personalized location-based comments based on passenger context and vehicle proximity to the location, according to one embodiment. In one embodiment, the privacy-respectful and personalized location-based comments can be associated with a location in map data (e.g., map data of a geographic database 117) for the system 100 to either present privacy-respectful and personalized location-based comments to the user or take actions based on the freshness of the personalized location-based comments. The map data can include digital map data, high resolution map data, indoor map data, etc.

In one embodiment, the system 100 queries a database for the privacy-respectful and personalized location-based comments based on the location of the vehicle and a privacy level associated with the user. The privacy level may be set by the system 100 and/or the user. In one embodiment, the privacy level is set based on one more privacy rules and/or policies defined via privacy context parameters with respect to user context, passenger context, vehicle context, environmental context, etc.

In one embodiment, the privacy levels are set as from low: "almost impersonal" to high: "extremely personal" considering the context, including but not limited to user context, passenger context, vehicle context, environmental context, etc. For example, the user sets a privacy rule of not playing highly personal content when the user is with another passenger in the car which is not from a close family. As another example, the user sets a privacy rule of not playing highly personal content when the user is passing a particular point of interest, location, street, area, city, etc. in a geofence-like manner.

In other embodiments, the privacy levels are set based on social relationship distances between users, frequency and/or length of social interactions (e.g., in person meetings, calls, emails, texts, IMs, likes, etc.) among the users, and/or the like, with respect to any numbers of kinds/types/granularity levels of personal data.

In one embodiment, the privacy levels may be set as five: user only, family, friends, contacts, public. In another embodiment, the five privacy levels are further broken down into sub-levels based on user context/preferences, passenger context/preferences, vehicle context, environmental context, etc. For example, the system 100 and/or the user sets a privacy rule of sharing personal data of friends only in their presence. When Joe and/or his wife are in the same vehicle with the user, the system 100 can present: "In 100 meters, you will arrive at the place where your friend Joe proposed his wife after 8 years together in 2009, click here to view the related photos and comments on social media."

The system 100 and/or the user may set privacy sub-rules of sharing personal data of close friends only in their presence per kind/type of personal data, e.g., names, activity types, event types, event times, event location type, data formats, etc. For example, the user sets a privacy rule of not making comments that could give hints about her/his age unless direct family members, such as "Here are now the film studios where the movies you were watching were shots when you were a teenager."

Per each kind/type of personal data, the system 100 and/or the user may further set a granularity level. For instance, the event time is limited to year, but not to disclose season, month, day, time of the day, etc., the name is limited to a first name without the last name of a close friend, and the shared data format is limited to photos but not video or audio recordings.

It is contemplated that the approach describe herein is applicable to any privacy setting, rule and/or policy or combinations of privacy settings, rules and/or policies.

The database includes a plurality of personalized privacy-sensitive spatial data records associated with the user, and the plurality of personalized privacy-sensitive spatial data records is classified according to a plurality of predetermined privacy levels.

The map data was assembled from sensor data, contextual data, or a combination thereof during operations of a plurality of vehicles. By way of example, the vehicles (e.g., vehicles 101) may be autonomous or semi-autonomous vehicles (e.g., cars, buses, scooters, etc.). In one embodiment, the vehicles could be any means of transportation where a passenger is not in control (e.g., an airplane, a train, a ferry, etc.).

In one embodiment, the map data can be combined with historical data for the same geographic areas of interest (e.g., the location in which a vehicle is expected to drive). The historical data, for instance, comprises data collected on vehicle drives or trajectories (e.g., vehicle probe data representing historical travel data as a sequence of time-ordered vehicle and heading measurements), corresponding user events (e.g., concerts, festivals, parades, etc.) and/or activities (e.g., sightseeing, biking, shopping, etc.) taking place at locations along a route of the vehicle, and/or other related data (e.g., weather, visibility, etc. at the time of the drive). In this way, according to one embodiment, the privacy-respectful and personalized location-based comments can be generated and/or retrieved based on historical activity data, historical travel data, or a combination thereof collected from the location along a route of the vehicle.

In one embodiment, the system 100 can determine a location of interest for a vehicle based on any means. For example, if the user has entered a destination into a navigation system, the predicted route can be used to determine what geographic point or road segment is coming next. Then the comments generated and/or stored in the database and/or the map data of the location can be used. In another example, if a destination is not determined, the system 100 can use historical data to determine a probability that the vehicle 101 will make a certain maneuver. For example, the system 100 can calculate a probability D to indicate what road segment among different road segments a vehicle 101 is likely to take. By way of example, the probability D can be a joint probability distribution or matrix for parameters X, Y, Z, . . . that gives the probability that each of X, Y, Z, . . . falls in any particular range or discrete set of values specified for that variable. For example, X can be an average speed profile parameter (e.g., three out of four times that vehicles with an average speed of 15 Mph made a right turn and one out of four times that the vehicles with an average speed of 45 Mph drove straight via), Y is a is a personal reaction time parameter (e.g., 5 minutes), and Z is a maneuver distance parameter (e.g., 200 feet).

In one embodiment, the calculated probability can then be used to determine which road segment to travel by the user based on the individual parameters. Once the road segment to travel by the user is determined, the system 100 can determine which privacy-respectful and personalized location-based comment to present in the vehicle.

In one embodiment, the system 100 presents the privacy-respectful and personalized comment before passing the associated location. In another embodiment, the system 100 presents the privacy-respectful and personalized comment when passing the associated location. In another embodiment, the system 100 presents the privacy-respectful and personalized comment after passing the associated location.

In one embodiment, the system 100 presents the privacy-respectful and personalized comment, for example, in an audio interface, a haptic interface, and/or a visual interface.

Such haptic interface applies haptic technologies that recreate the sense of touch by applying forces, vibrations, and/or motions to the user, such as simulating an activity/event like an earthquake, a car accident, etc. using vehicles 103, UE 105, etc.

Such visual interface may include a two dimensional (2D), three dimensional (3D), augmented reality (AR), and/or virtual reality (VR) view inside a vehicle, such as on a window (e.g., a vehicle windshield, a heads-up display, etc.) or in a display (e.g., a handheld display such as a mobile phone or an integrated dashboard or headrest display).

In one instance, the user interface could also be a goggle or an eyeglass device used separately or in connection with a mobile device. In one embodiment, the system 100 can present or surface the privacy-respectful and personalized comment in multiple interfaces simultaneously (e.g., presenting a 2D map, a 3D map, an AR view, a VR display, or a combination thereof). In one instance, the system 100 can present the privacy-respectful and personalized comment through multiple interfaces within the vehicle based on the location or positioning of the passengers (e.g., a windshield for passengers in the front seats and on side windows for passengers in the back seats). For example, each passenger in the vehicle is presented with a different privacy-respectful and personalized comment based on a privacy level associated with the passenger.

To deliver comments with different privacy levels for different passengers, the system 100 deploys various visual technologies, such as adapting different projection depths to make one image visible to one passenger from one viewing angle while invisible or substantially invisible for another passenger from another viewing angle.

In one embodiment, the system 100 could also present the privacy-respectful and personalized comment to a passenger through one or more audio signals, such as sounds, music, etc. To deliver comments with different privacy levels for different passengers, the system 100 can deploy various directional precisely controlled audio technologies, such as focused audio technologies that generate a tight, narrow beam of sound aiming at a particular passenger in the vehicle and quiet for other passengers. For example, the system 100 could deliver the privacy-respectful and personalized comment through speakers or the like of the vehicle that adapt the focused audio technologies as accurate as within 20 cm.

In another embodiment, the system 100 delivers comments in different languages depending on the comments and the relevel privacy levels. For example, a language shared by a group of passengers (e.g., French) is used to deliver a comment to be shared by the passengers while other passengers do not know the language will not understand the comment. As another example, different languages are used for different comments for different passengers only known to each respective passenger, so none of the comments will be shared.

This presentation of the privacy-respectful and personalized comment can help the passenger to remember past precious moments and have a deeper connection with the relevant location.

In one embodiment, the system 100 can detect user context via sensor data, etc. The sensor data may be collected using a sensor configured to detect the presence of one or more other passengers in the vehicle, which affect the privacy level applicable to the privacy-respectful and personalized comment.

In one embodiment, when there are several privacy-respectful and personalized comments associated with the same location, the system 100 can prioritize or rank the privacy-respectful and personalized comments based on the user and/or vehicle context, and determines to present one or more of the privacy-respectful and personalized comments, before/during/after the vehicle passing the location.

In another embodiment, when there are several privacy-respectful and personalized comments associated with locations in the vicinity, the system 100 can prioritize or rank the privacy-respectful and personalized comments based on the user and/or vehicle context, and determine to present one or more of the privacy-respectful and personalized comments, before/during/after the vehicle passing the location.

The user contextual data may include, for example, user profile data, user preferences, user behaviors/activities in the vehicle, etc. The vehicle contextual data may include, for example, mapping or route information, passenger location and/or positioning within the autonomous vehicle, object movement information (e.g., static versus moving), status information (e.g., traffic light status, construction status, etc.), time of day, weather conditions, visibility, historical data, etc. In one embodiment, the system 100 collects the sensor data, contextual data, or a combination through one or more sensors such as camera sensors, light sensors, Light Imaging Detection and Ranging (Lidar) sensors, Radio Detection and Ranging (Radar), infrared sensors, thermal sensors, and the like, to determine the type/kind of the non-driving activities.

In one embodiment, the system 100 processes the sensor data, the contextual data, or a combination thereof to determine the user behaviors/activities in the vehicle. The user behaviors/activities in the vehicle may be independent from a user device, such as eating, reading a book, tending to children, sleeping, applying make-up, etc. The user behaviors/activities in the vehicle may be performed on the user device, such as making or receiving a call, writing or sending messages/posts/comments, taking pictures, browsing internet, recording videos, watching movies, reading a book or e-book, gaming, VR use, etc. The privacy-respectful and personalized comments can be generated/retrieved from the database and/or the map data based on a relevance factor of a privacy-respectful and personalized comment to the user behaviors/activities in the vehicle.

In one embodiment, the system 100 can detect a user's or passenger's gaze, heartrate, sweat rate or perspiration level, eye movement, body movement, or a combination thereof. In one instance, the body movement could include a passenger pointing at a tree with a finger, or any other movements. For example, the system 100 could track the eyes of a passenger (e.g., focusing at a museum on the left and then a plaza on the right) to determine the type/kind of points of interest or an object the user is focusing, in order to present privacy-respectful and personalized comments accordingly.

The presentation of the privacy-respectful and personalized comments to a passenger by the system 100 can inform and entertain the passenger(s) inside of the autonomous vehicle with relevant and personal information. The system 100, for instance, in addition to providing an audio and/or visual representation, can also provide a passenger with a recommendation of actions to stop at the location, to edit/correct the privacy-respectful and personalized comments, to bookmark, forward, like, and/or post the privacy-respectful and personalized comments, to leave a new comment on privacy-respectful and personalized comments, to edit/correct the new comment, to bookmark, forward, like, and/or post the new comment, etc. Since there are limits of each passenger, e.g., how far into the past a passenger normally remembers different events, the presentation of the privacy-respectful and personalized comments can bring back the memory.

In one embodiment, to generate and/or retrieve privacy-respectful and personalized location-based comments, the system 100 extracts from a personal map data collected during user historical walking/jogging/running/biking activities, historical vehicle operations (e.g., autonomous and/or semi-autonomous cars) to save real-time computing and/or communication resources. The personal map data can be stored on the UE 105 and/or a cloud. In one embodiment, the personal map data (e.g., data indicating or used for indicating specific actions or maneuvers the user/vehicle performed at different locations). For example, the system 100 and/or the user created a one-week New York City touring maps with locations and/or route markers as well as texts, URLs, photos, videos tagged thereon that are generated by the user and/or other users for a family trip in 2016.

In one embodiment, the system 100 can then present privacy-respectful and personalized location-based comments based on the one or more specified parameters. By way of example, a parameter can include a time duration (e.g., 5 seconds, 10 seconds, 20 seconds, etc.), a starting time (e.g., a user initiated starting time or a starting time determined by the system 100 based on data of the privacy-respectful and personalized location-based comments), a time direction (e.g., forwards or backwards), starting direction, etc. or a combination thereof. Following the examples described above for a car, the system 100 can present privacy-respectful and personalized location-based comments for a user in a train, an airplane, or a boat, for example. In one embodiment, the privacy-respectful and personalized location-based comments can be based on vehicle telemetry data where other traditional means of recording past events (e.g., recorded video) to conserve real-time consumption of system resources by pre-processing and storing privacy-respectful and personalized location-based comments in the map data and/or the personal map data.

In one embodiment, when the system 100 determines a highly relevant comment cannot be played in the vehicle due to a privacy level and/or other privacy restrictions, the system 100 queues the highly relevant comment to play to the user later, based on a relevant privacy rule associated with the user. For example, the privacy rule is set as: not to comment on the Summer Street junction where Uncle Joe was hit by a car, when any family member is in the vehicle; yet playing the comment later when the family member leaves the vehicle. Such a privacy rule may be set by the user when passing by the Summer Street junction, by saying a voice command to system 100: "Tag the Summer Street junction in 100 feet as where Uncle Joe was hit by a car, and delay comment on the Summer Street junction until no family member is in the vehicle."

In one embodiment, the system 100 can detect via a sensor or receiving an input specifying data indicating a reaction of the user to the presentation of the privacy-respectful and personalized location-based comments. The input can be received via a user interface and/or a user interface element. By way of example, a user interface and/or the user interface element could include an interface that enables gestures/touch interaction, an interface that enables voice commands, a knob or roller ball-based interface, etc. In one embodiment, the system 100 and the user interface element, e.g., a joystick, enable a passenger to leave feedback/reaction for the to the presentation of the comments.

In one embodiment, the user interface element (e.g., a knob, a roller or trackball-based interface, etc.) may also be used by a passenger to control the presentation of privacy-respectful and personalized location-based comments. In one instance, a passenger can use the interface element to control and manipulate the visualization of the privacy-respectful and personalized location-based comments over time (i.e., "playing with the time") by varying colors, styles, screen positions, etc. of the comments in a variety of increments (e.g., 5 second, 10 second, 20 second). In one embodiment, a passenger may also tailor the presentation to her/his interests, for example, presenting only one comment, multiple comments, for a specific time period of the future, or based on a relevance factor of the comment (i.e., until a threshold value based on time and context is met).

In one embodiment, the system 100 or the user could organize the comment presentations in the user interfaces based on a relevance factor to one user's preferences (e.g., more relevant comments being presented on the windshield or a heads-up display and comments of less interest being presented on side windows).

In another embodiment, after the system 100 presents respective privacy-respectful and personalized location-based comments to different passengers. The system 100 identifies whether the user acknowledged the comments and if any reaction the user had to the comments. By way of example, the system 100 can determine that a comment has a high relevant factor for the user with a location either implicitly (e.g., through sensors, such as brain reading technology, monitoring physical changes such as increasing heart rate, pulse, adrenaline levels, breathing patterns, etc.) or explicitly (e.g., user inputs/surveys, etc.). Using the reaction, the system 100 can modify a subsequent personalized comment.

In one embodiment, the system 100 can enable the user to modify the comments. By way of example, a user may decide to leave out the year from the comment. Although there are more passengers in the example of a plane, train, ferry, etc., the system 100 can enable each passenger to modify his/her respective comments. However, when there is a shared comment among the passengers, e.g., including personal data of individual passengers, the system 100 detects a majority of the passengers sharing an identical preference, and allow the users to collectively modify the comment, etc. much like a single user would modify a comment.

In one embodiment, the system 100 provides the user information regarding personal data sources of a comment, information regarding how the personal data was obtained, and/or information regarding from where the comment is extracted. In one embodiment, the system 100 presents an interactive icon or tab of "how does the system know this?" when the comment is played, for the user to select. After the user selection, the system 100 provides additional data source details about the comment and/or go to the data source. For example, the system 100 shows that the comment was based on a photo album, face recognition of the involved people, content extracted from SMS messages of the user, an extracted phone conversation, public information about a social media event, etc.

As shown in FIG. 1A, the system 100 comprises one or more vehicles 101a-101n (also collectively referred to herein as vehicles 101) configured with one or more vehicle sensors 103a-103n (also collectively referred to herein as vehicle sensors 103), one or more user equipment (UE) 105a-105n (also collectively referred to herein as UEs 105) having connectivity to a presentation platform 107 via a communication network 109. In one embodiment, the vehicles 101 are autonomous vehicles or highly assisted driving vehicles that can sense their environments and navigate within a travel network 111 without driver or occupant input. In one embodiment, one or more passengers are riding within the vehicle 101a. Although the vehicles 101 are depicted as automobiles, it is contemplated the vehicle 101 may be an any type of transportation wherein a passenger is not in control (e.g., an airplane, a train, a ferry, etc.). In one embodiment, the vehicle sensors 103 (e.g., camera sensors, light sensors, Lidar sensors, radar, infrared sensors, thermal sensors, and the like) acquire map data during an operation of the vehicle 101 along one or more roads 113 within the travel network 111. By of example, the map data may include mapping or route information, and optionally traffic status information (e.g., traffic light status, construction status, etc., time of day, weather conditions, visibility information, historical data, etc.). In one embodiment, the vehicle sensors 103 can determine passenger location and or positioning within the vehicle 101 and whether a passenger is focusing on a location or an object outside of the vehicle.

In one embodiment, the UEs 105 can be associated with any of the types of vehicles or a person or thing traveling within the travel network 111. By way of example, the UE 105 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the UE 105 can support any type of interface to the user (such as "wearable" circuitry, etc.). In one embodiment, the one or more vehicles may have cellular or wireless fidelity (WI-FI®) connection either through the inbuilt communication equipment or from the UE 105 associated with the vehicles 101. Also, the UEs 105 may be configured to access a communication network 109 by way of any known or still developing communication protocols. In one embodiment, the UEs 105 include a user interface element configured to receive a user input (e.g., a knob, a joystick, a rollerball or trackball-based interface, a touch screen, etc.). In one embodiment, the user interface element could also include a pressure sensor on a screen or a window (e.g., a windshield of a vehicle 101, a heads-up display, etc.) whose intensity reflects the movement of time, an interface element that enables gestures/touch interaction by a user, an interface element that enables voice commands by a user, or a combination thereof. In one embodiment, the UEs 101 may are configured with various passenger sensors 115a-115 (also collectively referred to herein as passenger sensors 115) for collecting passenger sensor data during an operation of the vehicle 101 along one or more roads 113 within the travel network 111. By way of example, the passenger sensors 115 are any type of sensor that can detect a passenger's gaze, heartrate, sweat rate or perspiration level, eye movement, body movement, or combination thereof, in order to determine whether a passenger is focusing on a point of interest or object outside of the vehicle, etc.

In one embodiment, the vehicles 101 also have connectivity to a presentation platform 107 over the communication network 109. In one embodiment, the presentation platform 107 performs the process for presenting privacy-respectful and personalized location-based comments based on passenger context and vehicle proximity to the location as discussed with respect to the various embodiments described herein. In one embodiment, the presentation platform 107 can be a cloud-based platform that collects and processes sensor data from sensors 103 and 115, contextual data regarding the passengers and the vehicle 101's surroundings, or a combination thereof. In one embodiment, the presentation platform 107 can be a standalone server or a component of another device with connectivity to the communication network 109. For example, the component can be part of an edge computing network where remote computing devices (not shown) are installed along or within proximity of the travel network 111. In one embodiment, the presentation platform 107 performs functions related to generating mapping data (e.g., location-based records) related to static objects proximate to the vehicle 101 (e.g., vehicles, pedestrians, traffic lights, etc.) and correlates them to geographic areas described in a geographic database 117. In one embodiment, the presentation platform 107 has connectivity over the communication network 109 to the services platform 119 (e.g., an OEM platform) that provides one or more services 121a-121n (also collectively referred to herein as services 121) (e.g., sensor data collection services). By way of example, the services 121 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, content providers 123a-123n (collectively referred to as content providers 123) may provide content or data (e.g., including geographic data, parametric representations of mapped features, historical data, etc.) to the geographic database 117, the presentation platform 107, the services platform 119, the services 121, and the vehicles 101. The content provided may be any type of content, such as map content, contextual content, audio content, video content, image content, etc. In one embodiment, the content providers 123 may also store content associated with the geographic database 117, presentation platform 107, services platform 119, services 121, and/or vehicles 101. In another embodiment, the content providers 123 may manage access to a central repository of data, and offer a consistent, standard interface to data, such as a repository of the geographic database 117.

By way of example, as previously stated the vehicle sensors 103 may be any type of sensor. In certain embodiments, the vehicle sensors 103 may include, for example, a global positioning sensor for gathering location data, a network detection sensor for detecting wireless signals or receivers for different short-range communications (e.g., a wireless technology standard for exchanging data between fixed and mobile devices using short-wavelength UHF radio waves (BLUETOOTH®), wireless fidelity (WI-FI®), light fidelity (LI-FI®) , near field communication (NFC) etc.), temporal information sensors, a camera/imaging sensor for gathering image data (e.g., for detecting objects proximate to the vehicle 101a), an audio recorder for gathering audio data (e.g., detecting nearby humans or animals via acoustic signatures such as voices or animal noises), velocity sensors, and the like. In another embodiment, the vehicle sensors 103 may include sensors (e.g., mounted along a perimeter of the vehicle 101) to detect the relative distance of the vehicle from lanes or roadways, the presence of other vehicles (e.g., vehicle 101n), pedestrians, animals, traffic lights, road features (e.g., curves) and any other objects, or a combination thereof. In one scenario, the vehicle sensors 103 may detect weather data, traffic information, or a combination thereof. In one example embodiment, the vehicles may include GPS receivers to obtain geographic coordinates from satellites 125 for determining current location and time. Further, the location can be determined by a triangulation system such as A-GPS, Cell of Origin, or other location extrapolation technologies when cellular or network signals are available. In another example embodiment, the one or more vehicle sensors 103 may provide in-vehicle navigation services.

The communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WI-FI®), wireless LAN (WLAN), a wireless technology standard for exchanging data between fixed and mobile devices using short-wavelength UHF radio waves (BLUETOOTH®), Internet Protocol (IP) data casting, satellite, mobile ad-hoc network (MANET), and the like, or any combination thereof.

In one embodiment, the presentation platform 107 may be a platform with multiple interconnected components. By way of example, the presentation platform 107 may include multiple servers, intelligent networking devices, computing devices, components and corresponding software for determining upcoming vehicle events for one or more locations based, at least in part, on signage information. In addition, it is noted that the presentation platform 107 may be a separate entity of the system 100, a part of the services platform 119, the one or more services 121, or the content providers 123.

In one embodiment, the geographic database 117 stores information on road links (e.g., road length, road breadth, slope information, curvature information, etc.), probe data for one or more road links 113 (e.g., traffic density information), and historical accident data associated the road links 113 or other geographic areas within the travel network 111. The information may be any of multiple types of information that can provide means for triggering vehicle sensor activation based on proximate object detection. In another embodiment, the geographic database 117 may be in a cloud and/or in a vehicle 101 (e.g., an autonomous car) and/or a mobile device (e.g., a UE 105).

In another embodiment, the geographic database 117 stores the afore-discussed personal map data.

By way of example, the vehicles 101, the UEs 105, the presentation platform 107, the services platform 119, and the content providers 123 communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 1B is a diagram of the geographic database 117 of the system 100, according to exemplary embodiments. In the exemplary embodiments, map data, contextual data, privacy-respectful and personalized location-based comments, relevance data, confidence data, etc. can be stored, associated with, and/or linked to the geographic database 117 or data thereof. In one embodiment, the geographic or map database 117 includes geographic data 161 used for (or configured to be compiled to be used for) mapping and/or navigation-related services, such as for triggering privacy-respectful and personalized location-based comments as discussed in the various embodiments described herein. The geographic data 161 can also be used for personalized route determination, according to exemplary embodiments. For example, the geographic database 117 includes node data records 163, road segment or link data records 165, POI data records 167, comment data records 169, passenger records 171, and indexes 173 for example. More, fewer or different data records can be provided. In one embodiment, the additional data records (not shown) can include cartographic ("carto") data records, routing data, and maneuver data. In one embodiment, the indexes 173 may improve the speed of data retrieval operations in the geographic database 117. For example, the indexes 173 may be used to quickly locate data without having to search every row in the geographic database 117 every time it is accessed.

In exemplary embodiments, the road segment data records 165 are links or segments representing roads (e.g., road 113 of the travel network 111), streets, parking areas, or paths, as can be used in the calculated route or recorded route information for determination of one or more personalized routes, according to exemplary embodiments. The node data records 163 are end points corresponding to the respective links or segments of the road segment data records 165. The road link data records 165 and the node data records 163 represent a road network or travel network 111, such as used by vehicles, cars, and/or other entities. Alternatively, the geographic database 117 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 117 can include data about the POIs and their respective locations in the POI data records 167. The geographic database 117 can also include data about places, such as cities, towns, or other communities, and other geographic features, such as bodies of water, mountain ranges, etc. Such place or feature data can be part of the POI data 167 or can be associated with POIs or POI data records 167 (such as a data point used for displaying or representing a position of a city).

In one embodiment, the geographic database 117 also includes comment data records 169. For example, a comment data record 169 may specify one or more privacy-respectful and personalized location-based comments mapped to a location of the geographic data 161, such as "In 100 m, you will arrive at the place with a tree where your friend Joe proposed his wife after 8 years together in 2009, click here to view the related photos and comments on social media". In another embodiment, the comment is anonymized by excluding user identification data therefrom, such as "In 100 m, you will arrive at the place with a tree where one friend proposed his wife."

In one embodiment, the geographic database 117 also includes passenger records 171. Personal data included in the passenger records 171 may be derived from a lot of different sources, including but not limited to online data sources (e.g., applications/sites of social media, gaming, health/sport trackers, dating, mapping, content consumption—movies, music, finance, weather, news, podcasts, etc., etc.), offline data sources, or a combination thereof associated with the user/passenger. For example, a passenger record 171 includes a family tree, a photo library, a history of online and offline purchases, a history of consumed media, a contact history, medical data, or a combination thereof associated with the user.

In one embodiment, a passenger record 171 may include a personal reaction to a privacy-respectful and personalized location-based comment. For instance, the personal reaction can be used by the system 100 to modify the privacy-respectful and personalized location-based comment.

In one embodiment, the passenger records 171 are anonymized by excluding user identification data therefrom, and the system 100 uses other user profile and/or context data to generate/retrieve a privacy-respectful and personalized location-based comment for a passenger, such as "In 100 m, you will arrive at a popular wedding photo location with a tree for young tourists like yourself, click here to view the related photos and comments on social media". In one embodiment, the user profile data includes, but not limited to, age, birthplace, genetic information (e.g., gender, race, etc.), marriage status, criminal records, activity records, employment status, medical status, political and non-political affiliations, preferences (e.g., POIs), calendar data, driving history data, vehicle sharing data, etc. of the user. In one embodiment, the user context data includes, but not limited to, a destination of the user, a type of the destination of the user, a proximity of the user location the destination, availability of an alternate destination for the user, a number of passengers accompanying the user, weather data in the vicinity of the user, etc.

The privacy-respectful and personalized location-based comments can be further specified by a mode of transport (e.g., bus, boat, airplane, etc.). In this way, the comment data record 169 can provide information based on vehicle context data occurring at the location associated with an object (e.g., a tree 127 of FIG. 1A). In addition, the comment data record 169 can indicate a privacy level corresponding to the location of the geographic data and the mode of transport for the system 100 to present a privacy-respectful and personalized location-based comment to the passenger when approaching the location.

The geographic database 117 can be maintained by the content provider 123 in association with the services platform 119 (e.g., a map developer). The map developer can collect geographic data to generate and enhance the geographic database 117. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 117 can be a master geographic database stored in a format that facilitates updating, maintenance, and development. For example, the master geographic database 117 or data in the master geographic database 117 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as a navigation system of the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 117 can be a master geographic database, but in alternate embodiments, the geographic database 117 can represent a compiled navigation database that can be used in or with end user devices (e.g., vehicles 101, UEs 105) to provide navigation-related functions or location-based functions (e.g., triggering vehicle sensor activation based on objects such as a second vehicle crossing the path and route of the vehicle 101*a*). For example, the geographic database 117 can be used with the vehicle 101 to provide an end user with navigation features. In such a case, the geographic database 117 can be downloaded or stored in a navigation system of the vehicle 101, or the vehicle 101 can access the geographic database 117 through a data connection over the communication network 109, for example.

Figure 2:
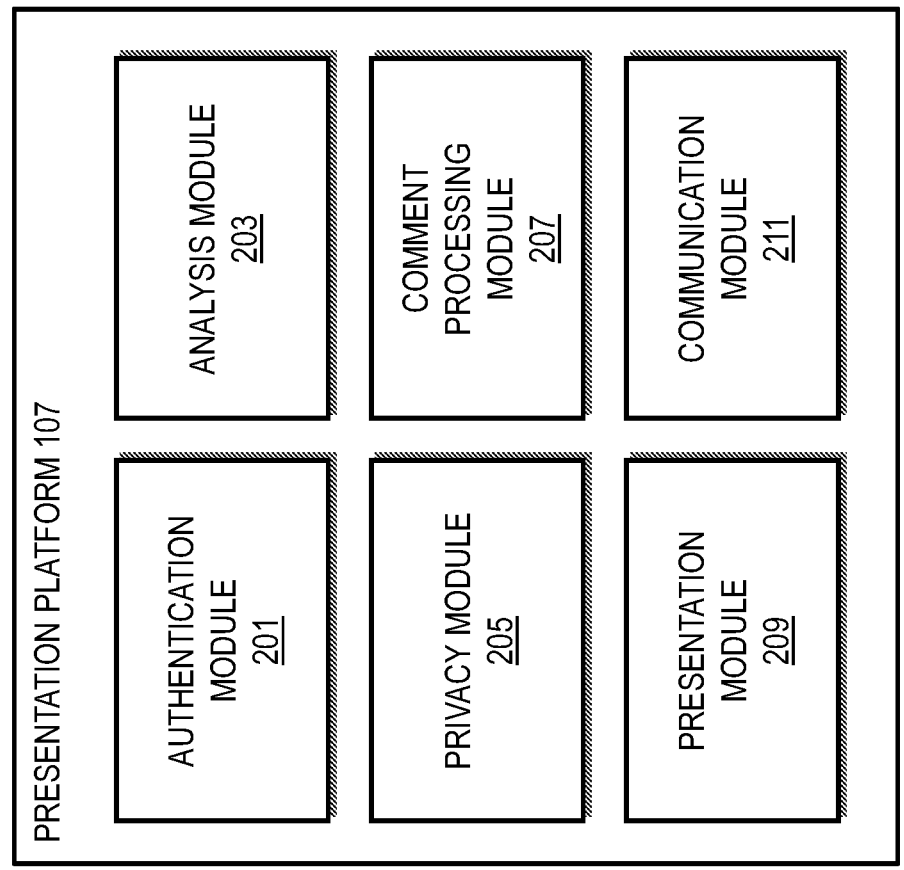
FIG. 2 is a diagram of the components of a presentation platform, according to one embodiment.

FIG. 2 is a diagram of the components of a presentation platform 107, according to one embodiment. By way of example, the presentation platform 107 includes one or more components for presenting privacy-respectful and personalized location-based comments based on passenger context and vehicle proximity to the location (e.g., an autonomous vehicle). It is contemplated that the functions of these components may be combined in one or more components or performed by other components of equivalent functionality. In one embodiment, the presentation platform 107 includes an authentication module 201, an analysis module 203, a privacy module 205, a comment processing module 207, a presentation module 209, and a routing module 211. The above presented modules and components of the presentation platform 107 can be implemented in hardware, firmware, software, or a combination thereof. Though depicted as a separate entity in FIG. 1A, it is contemplated that the presentation platform 107 may be implemented as a module of any of the components of the system 100. In another embodiment, the presentation platform 107 and/or one or more of the modules 201-211 may be implemented as a cloud-based service, local service, native application, or combination thereof. The functions of the presentation platform 107 and the modules 201-211 are discussed with respect to FIGS. 3-6 below.

In one embodiment, the authentication module 201 authenticates UEs 101 and/or associated vehicles 103 for interaction with the presentation platform 107. By way of example, the authentication module 201 receives a request to access the presentation platform 107. The request may be submitted to the authentication module 201 via the communication module 209, which enables an interface between the UEs 101 and/or associated vehicles 103 and the presentation platform 107. In addition, the authentication module 201 may provide and/or validate access by the UE 101 to upload sensor data, trajectory data, and/or other location-based information to the presentation platform 107. In one embodiment, the authentication module 201 may further be configured to support and/or validate the formation of profile by a provider of a service or content provider, e.g., for supporting integration of the capabilities for presenting privacy-respectful and personalized location-based comments based on passenger context and vehicle proximity to the location with the service or content provider.

The analysis module 203 processes the map data and the passenger records 127 to generate and/or retrieve a personalized location-based comment for an upcoming location. As described above, presenting a personalized location-based comment can enhance the passenger's riding experience. By way of example, the personalized location-based comment may be "In that stadium, your preferred tennis player won her first major tournament in 2001, see the press release here for more details."

In one instance, the sensor data may be collected by the sensors 115 and sent to the analysis module 203 to determine the vehicle context data via analyzing passenger location and/or positioning within the vehicle (e.g., the vehicle 101*a*), time of day, a user's or a passenger's gaze, heartrate, sweat rate or perspiration level, eye movement, body movements (e.g., hand gestures, jaw movements, head motions, arm/fingers movements, etc.), weather conditions, or a combination thereof.

In one embodiment, the vehicle context data may be sent to the privacy module 205 to determine a privacy level for modifying the personalized location-based comment into a privacy-respectful comment.

The comment processing module 207 then modifies the personalized location-based comment into a privacy-respectful comment based on the privacy level, such as "In that stadium, Serena Williams won her first major tournament in 2001," considering the other passenger is a stranger and can hear the audio comment.

In another embodiment, the privacy module 205 processes the map data and the passenger records 127 to determine a privacy level, without involving analysis module 203. The comment processing module 207 then generates and/or retrieves a privacy-respectful and personalized location-based comment for the upcoming location, based on the privacy level.

By way of example, the sensors 115 could include camera sensors, light sensors, Lidar sensors, radar, infrared sensors, thermal sensors, brain reading technology, a blood pressure cuff, a fingertip pulse oximeter and heart rate monitor, an eye tracking device, or a combination thereof. For example, the analysis module 203 or the privacy module 205 determines that the user is taking a photo of a stadium at the left side, while the other passenger is staring at a plaza on the right side. Since the other passenger is not looking at the user device of the user, the privacy module 205 determines a privacy level as high, and the comment processing module 207 determines to present on the viewfinder of the user device: "In that stadium, your preferred tennis player won her first major tournament in 2001, see the press release here for more details."

As another example, the analysis module 203 or the privacy module 205 determines that the user staring at a stadium on the left sight, while the other passenger is taking a photo of the stadium. Since the user is not looking at the user device of the user and both the user and the other passenger is focusing on the stadium, the privacy module 205 determines a privacy level as low, and the comment processing module 207 determines to play an audio comment via the passenger device: "In that stadium, Serena Williams won her first major tournament in 2001."

In one embodiment, the personalized location-based comments and/or the privacy-respectful and personalized location-based comments are retrieved by the system 100 from a map database stored in a node of a third party provider. In another embodiment, the map data is aggregated by the system 100 by processing the sensor data, the contextual data, or a combination thereof from a plurality of vehicles, and then generates the comments through one or more machine learning approaches, category filtering (e.g., field of view, line of sight, on route, distance, etc.), or a combination thereof.

In one embodiment, the system 100 generates the comments for each type of points of interest and stores the comments in a personal map database for a user. The personal map database be stored in a UE 105 of the user, or in the cloud.

In another embodiment, the comment processing module 207 dynamically modifies the comments based on a real-time context/situation, such as a speed of the vehicle, a personal reaction of the user, a distance to the upcoming location, etc.

The presentation module 209 presents one or more privacy-respectful and personalized location-based comments in a user interface. By way of example, the user interface can include any type of UE 105 (e.g., a mobile device or an in-dash navigation display). In one embodiment, the interface includes a user interface element configured to receive a user input (e.g., a knob, a joystick, a rollerball or trackball-based interface, a touch screen, etc.) to enable a user/passenger to specify a parameter or the comment presentation. In one instance, the user interface could comprise a pressure sensor on a screen or a window (e.g., a vehicle windshield or heads-up display) whose intensity reflects the movement of time, an interface that enables gestures/touch interaction, an interface that enables voice commands, pedals or paddles of a vehicle (e.g., the vehicle 101*a*). In one embodiment, the presentation module 209 can present the comments to a user/passenger in one or more possible rendered views (e.g., 2D, 3D, AR, VR, etc.). In one embodiment, the presentation module 209 can present one or more comments on a window (e.g., a windshield or heads-up display of a vehicle 101) or in a display (e.g., a handheld display or an integrated dashboard or headrest display). In one instance, the presentation module 209 can present the comments through a goggle or eyeglass-based device used separately or in connection with a mobile device (e.g., a UE 105).

In one embodiment, the presentation module 209 can present or surface the comments in multiple interfaces simultaneously (e.g., presenting an AR view on a windshield and a 2D map in a display). In one instance, the presentation module 209, in connection with the user interface, can present the comments through multiple interfaces within the vehicle (e.g., vehicle 101a) based on the location or positioning of the passengers (e.g., a windshield for passengers in the front seats and on side windows for passengers in the back seats). In one embodiment, the presentation module 209 can present the comments through one or more sounds. By way of example, the presentation module 209 could produce voice comments in different settings (e.g., male voice, female voice, English, Chinese, Spanish, etc.) through the speakers of the vehicle 101.

In one embodiment, the presentation module 209, in connection with the privacy module 203, could present recommendations for handling the comments, such as for adapting the comments to comply with a new privacy level.

In one embodiment, once the comments and/or recommendations are determined, the presentation module 209 can interact with the communication module 211 and/or the user interface to present to the user the cues. The presentation module 209 can interact with the communication module 211 and/or the user interface to present to the user the comments based on the recommendations, the new privacy level, and/or other update information related to the vehicle and user context.

It is further noted that the user interface may operate in connection with the communication module 211 to facilitate the exchange of real-time location information and/or vehicle information via the communication network 109 with respect to the services 121, content providers 123. Alternatively, the communication module 211 may facilitate transmission of the real-time location information and/or the vehicle information directly to the services 121 or content providers 123.

The above presented modules 201-211 and components of the presentation platform 107 can be implemented in hardware, firmware, software, or a combination thereof.

Figure 3:
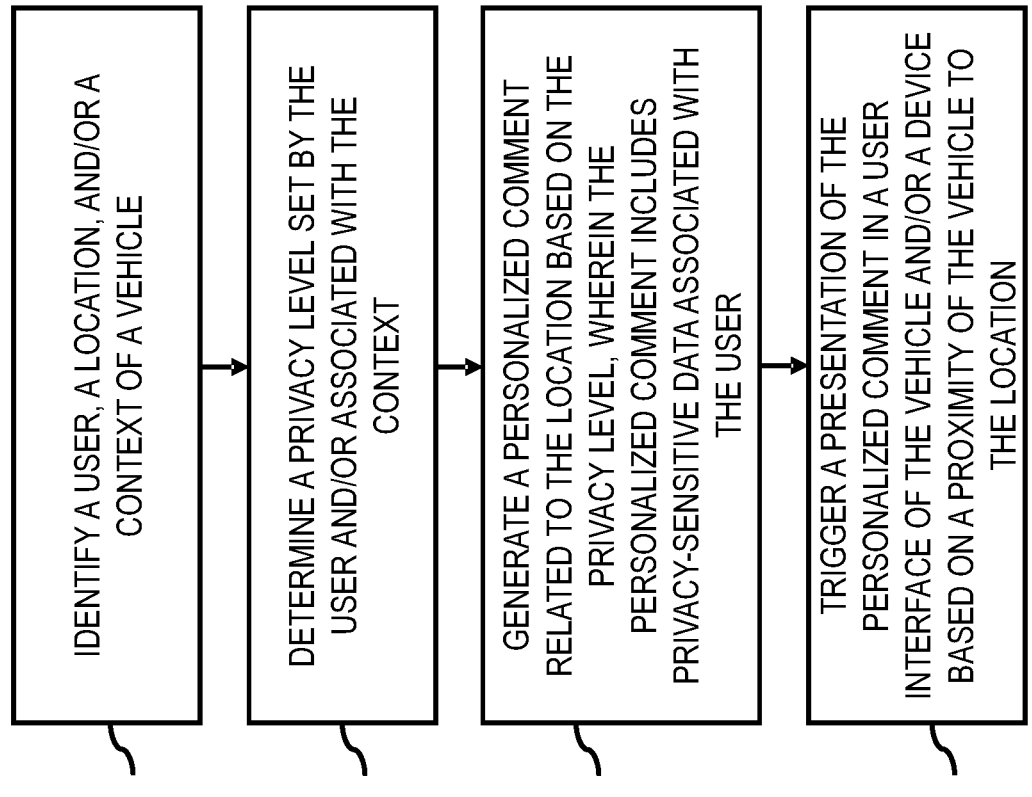
FIG. 3 is a flowchart of a process for presenting privacy-respectful and personalized location-based comments based on passenger context and vehicle proximity to the location, according to one embodiment.
Figure 9:
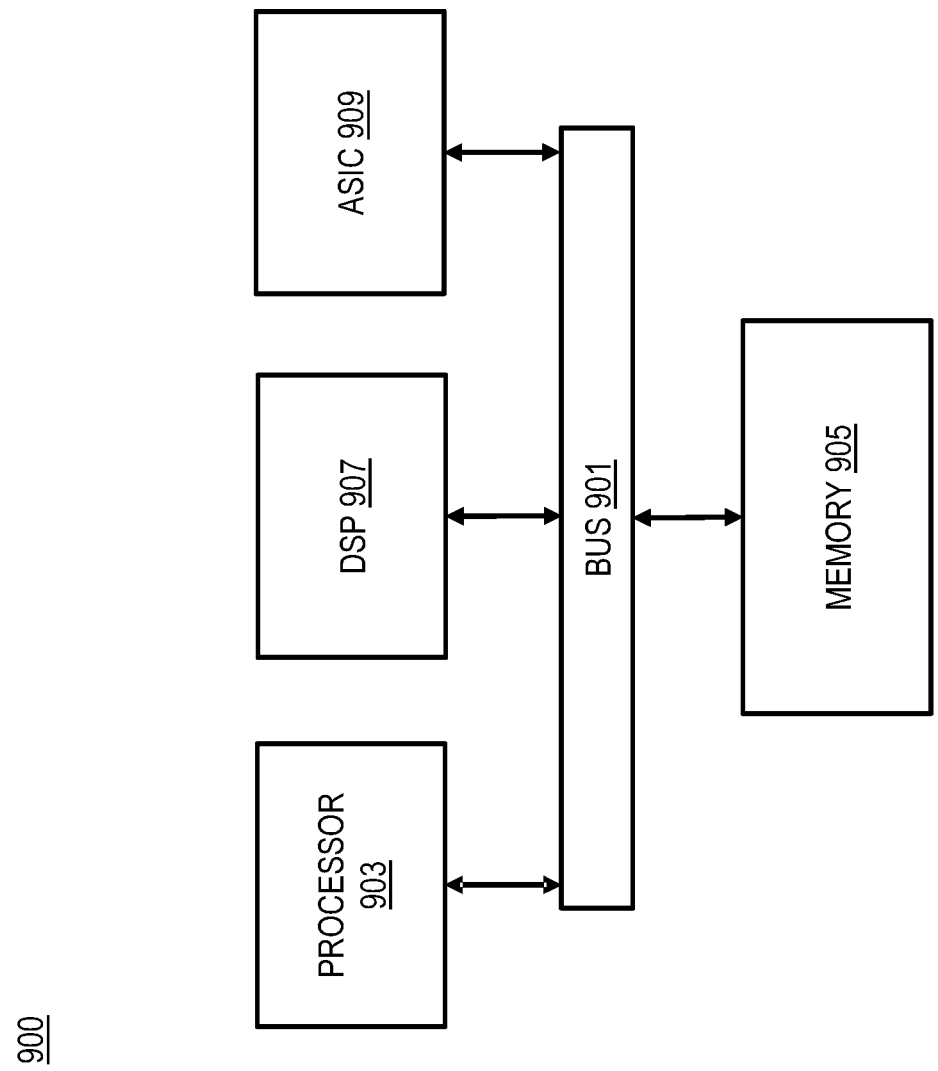
FIG. 9 is a diagram of a chip set that can be used to implement an embodiment of the invention.

FIG. 3 is a flowchart of a process for presenting privacy-respectful and personalized location-based comments based on passenger context and vehicle proximity to the location, according to one embodiment. In various embodiments, the presentation platform 107 and/or the modules 201-211 of the presentation platform 107 as shown in FIG. 2 may perform one or more portions of the process 300 and may be implement in, for instance, a chip set including a processor and a memory as shown in FIG. 9. As such, the presentation platform 107 and/or the modules 201-211 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

Figure 4:
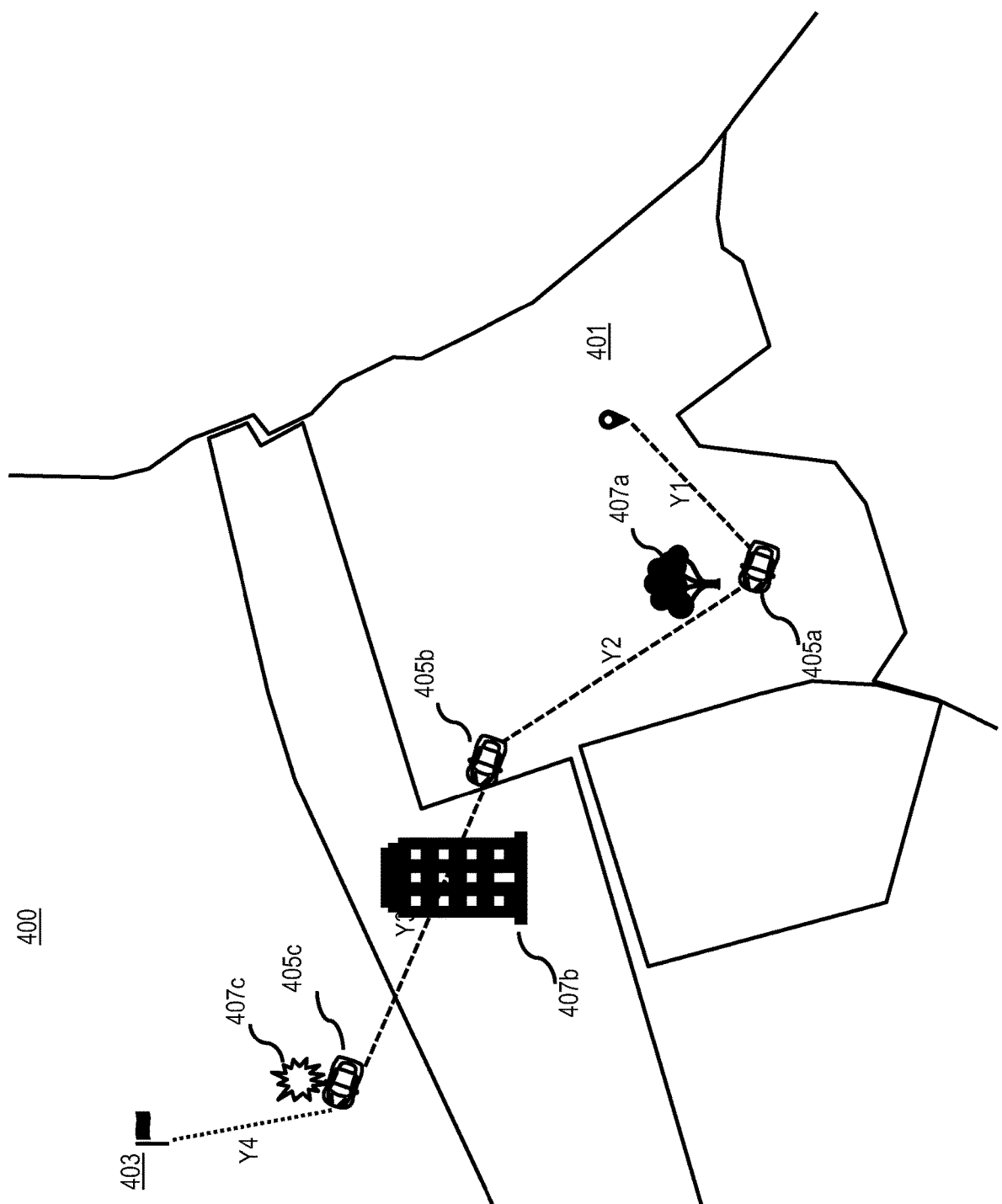
FIG. 4 is a diagram of a navigation route and respective locations associated with privacy-respectful and personalized location-based comments, according to one embodiment.

In step 301, the presentation platform 107 identifies a user of a vehicle, a location of the vehicle, a context of the vehicle, or a combination thereof. FIG. 4 is a diagram of a navigation route and respective locations associated with privacy-respectful and personalized location-based comments, according to one embodiment. For example, a user and three other passengers ride in a vehicle from a location 401 to a destination 403. The context of the vehicle includes that the vehicle has 4 seats and is in an autonomous driving mode, and the user sits on the front row with another passenger while the other two passengers are sitting on the back row. To simplify the discussion, FIG. 4 shows travel segments as straight lines instead of real-world road lines on a map. The presentation platform 107 determines the navigation route as the optimal route among all available transport modes available to the user during the time frame in the area. In this case, the optimal route includes four road segments Y1, Y2, Y3, Y4.

In step 303, the presentation platform 107 determines a privacy level set by the user, associated with the context, or a combination thereof.

For example, the user context includes that the user carries his/her own UEs 101 and using an earphone. Referring back to the example of FIG. 4, the presentation platform 107 determines that the vehicle is approaching a location 405a that is in the vicinity of the tree location 407a, and determines a privacy level of the user as high with respect to the UE 105.

In step 305, the presentation platform 107 generates a personalized comment related to the location, i.e., a privacy-respectful and personalized location-based comment, based on the privacy level. Such personalized comment, such as "On the right is the church where your grand-parents got married in 1922, it was by the way a very rainy day," includes privacy-sensitive or personal data associated with the user. For example, the privacy-sensitive data includes a physical attribute, a physiological attribute, a mental attribute, an economic attribute, a cultural attribute, a social identity attribute, or a combination thereof of the user or an entity associated with the user. The comment can be generated using advanced analytics like predictive analytics, data mining, big data analytics and machine learning, artificial intelligence (AI) technologies like machine learning, deep learning, etc., using personalized privacy-sensitive spatial data records retrieved from a database based on the location of the vehicle and the privacy level.

In one embodiment, the plurality of personalized privacy-sensitive spatial data records is classified according to a plurality of predetermined privacy levels, such as user only, family, friends, contacts, public and optionally with sub-levels defined by various user contact (e.g., age, activity, mood, etc.), passenger context (e.g., relationship with the user), vehicle context (e.g., vehicle model, time, location, speed, etc.), environmental context (e.g., weather), etc.

In one embodiment, the personalized privacy-sensitive spatial data records (e.g., Mary and John Smith, grand-parents of Jennifer Smith, were married at Mclean Bible Church on Oct. 25, 1922) are generated by the system 100 and/or third party content providers via parsing a plurality of location-tagged data records (e.g., Mary and John Smith were married at Mclean Bible Church on Oct. 25, 1922. Mclean Va. had 2 inches of rain on Oct. 25, 1922) from one or more online data sources, one or more offline data sources, or a combination thereof associated with the user.

For example, the one or more online data sources and/or the one or more offline data sources include a family tree (e.g., Mary and John Smith are grand-parents of Jennifer Smith), a photo library, a history of online and offline purchases, a history of consumed media, a contact history, medical data, or a combination thereof associated with the user.

In one embodiment, the database may be the geographic database 117, a part of the geographic database 117, lined with the records/data of the geographic database 117, or totally independent from the geographic database 117. In another embodiment, the database may be the personal map database as discussed, a part of the personal map database, lined with the records/data of the personal map database, or totally independent from the personal map database.

Figure 5:
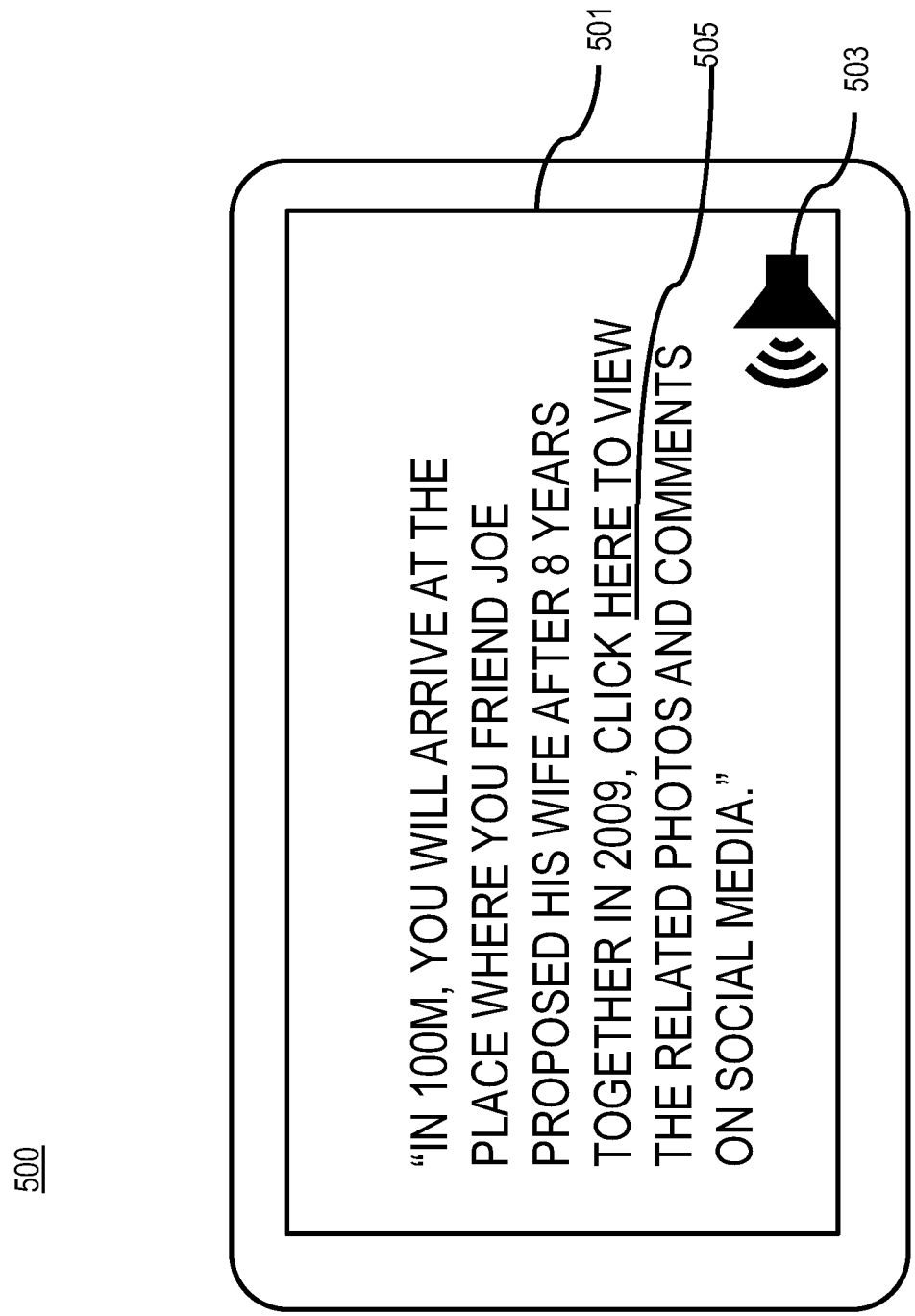
FIG. 5 is a diagram of user interfaces of a user device presenting a privacy-respectful and personalized location-based comment, according to various embodiments.

In step 307, the presentation platform 107 triggers a presentation of the personalized comment in a user interface of the vehicle, a device, or a combination thereof based on a proximity of the vehicle to the location. FIG. 5 is a diagram of user interfaces of the UE 105 presenting a privacy-respectful and personalized location-based comment, according to various embodiments. In this case, the presentation platform 107 shows a highly personalized location-based comment on a touch screen 501: "In 100 m, you will arrive at the place with a tree where your friend Joe proposed his wife after 8 years together in 2009, click here to view the related photos and comments on social media." Alternatively or concurrently, the presentation platform 107 provides the highly personalized location-based voice comment via a speaker 503. When receiving a user input on a position 505 of the word "here" on the touch screen, the presentation platform 107 retrieves and presents social media content, photos, trip details, flights, etc. on the touch screen 501 and/or via speaker 503.

In another embodiment, the user context includes a user familiarity with the location determined based on a number of detected visits by the user to the location. For example, the user carpools with a neighbor Wayne and drives via a bakery to pick up a coffee every morning on the way to work. The presentation platform 107 sets the privacy level as "friend" for the neighbor, and determines that the user is very familiar with the bakery. The presentation platform 107 presents a personalized comment based on the user familiarity and other available context as: "Happy birthday to Wayne, you can pick up his favorite cake in the Bakery at the coming corner with your coffee."

For frequently visited or passed via locations, such as the bakery, the presentation platform 107 presents different comments every time the user passes the same location to avoid repetition. In one embodiment, the presentation platform 107 compares the personalized comment, e.g., "Happy birthday to Wayne" to a database of previously presented comments, by determining a time at which a matching previously presented comment was presented to the user, e.g., Oct. 25, 2017. The presentation of the personalized is triggered based on determining that the time is not within a designated most recent time period, such as a year.

Figure 6:
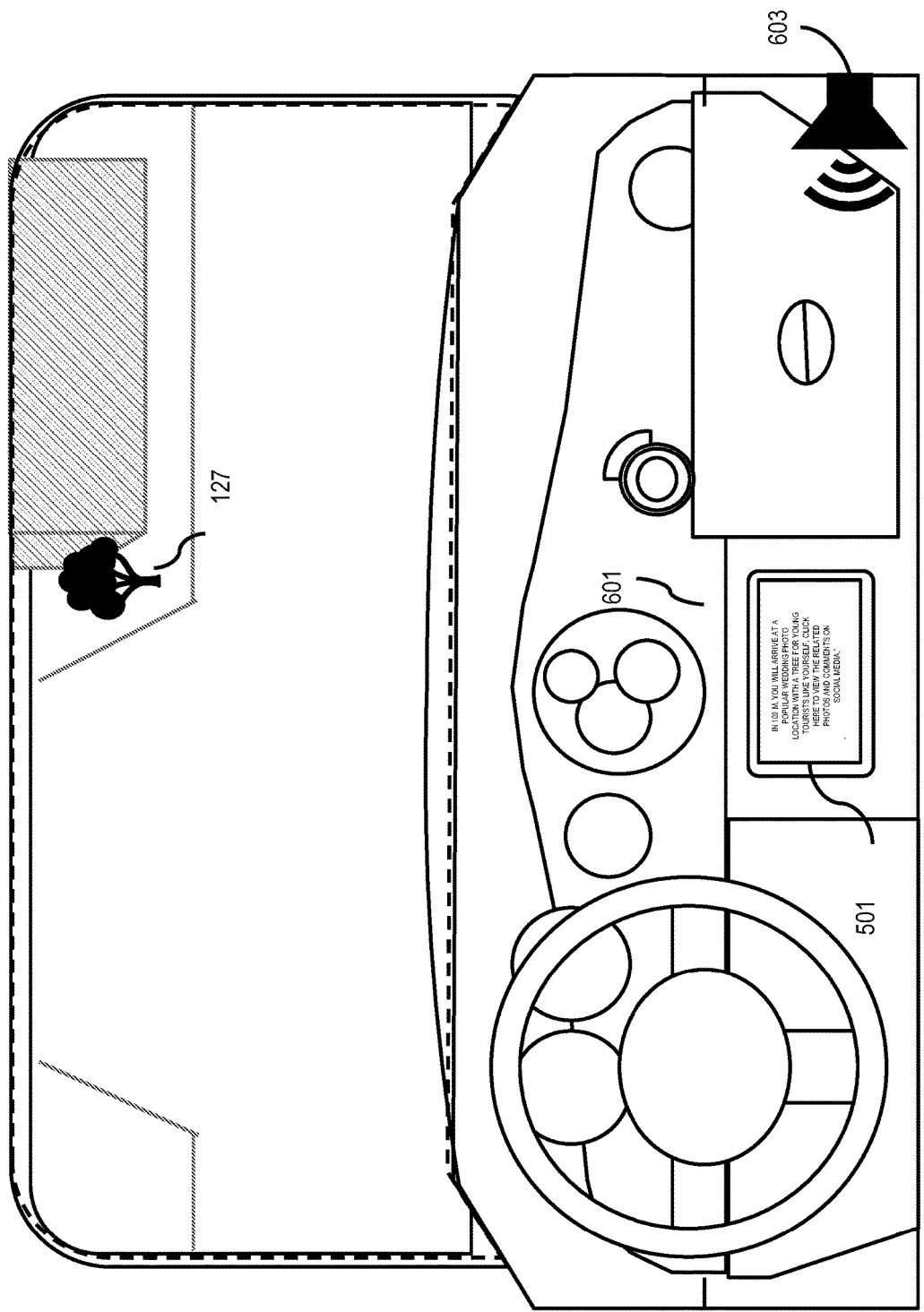
FIG. 6 is a diagram of user interfaces within a vehicle presenting a privacy-respectful and personalized location-based comment, according to various embodiments.

FIG. 6 is a diagram of user interfaces within a vehicle presenting a privacy-respectful and personalized location-based comment, according to various embodiments. In another embodiment, the user context includes that the user places his/her own UEs 101 placed on a vehicle control pane 601 and connecting to a speaker 603 of the vehicle. The presentation platform 107 determines a privacy level of the user is low with respect to the vehicle, since all other passengers can see the touch screen 501 and hear signs from the vehicle speaker. In this case, the presentation platform 107 shows a less personalized location-based comment on a touch screen 501: "In 100 m, you will arrive at a popular wedding photo location with a tree for young tourists like yourself, click here to view the related photos and comments on social media." Alternatively or concurrently, the presentation platform 107 provides the highly personalized location-based voice comment via the vehicle speaker 603.

The presentation platform 107 generates and/or retrieves different privacy-respectful and personalized location-based comments based on passenger preferences/context and vehicle proximity to the location. Referring back to the example of FIG. 4, the presentation platform 107 determines that the vehicle is approaching a location 405b that is in the vicinity of a hotel location 407b based on event data and social media data, and determines a privacy level of the user is high with respect to the UE 105. In this case, the presentation platform 107 shows a highly personalized location-based comment on the touch screen 501: "Mike F., whom you follow on social media and has two million followers, will talk about his last book in this hotel next Friday."

Referring back to the example of FIG. 4, the presentation platform 107 determines that the vehicle is approaching a location 405c that is in the vicinity of an intersection 407c based on probe data and historical traffic data, and determines a privacy level of the user is low with respect to vehicle. In this case, the presentation platform 107 shows a less personalized location-based comment on the touch screen 501: "Be careful at this complex junction, many accidents happened when taking a right turn here."

Figure 7:
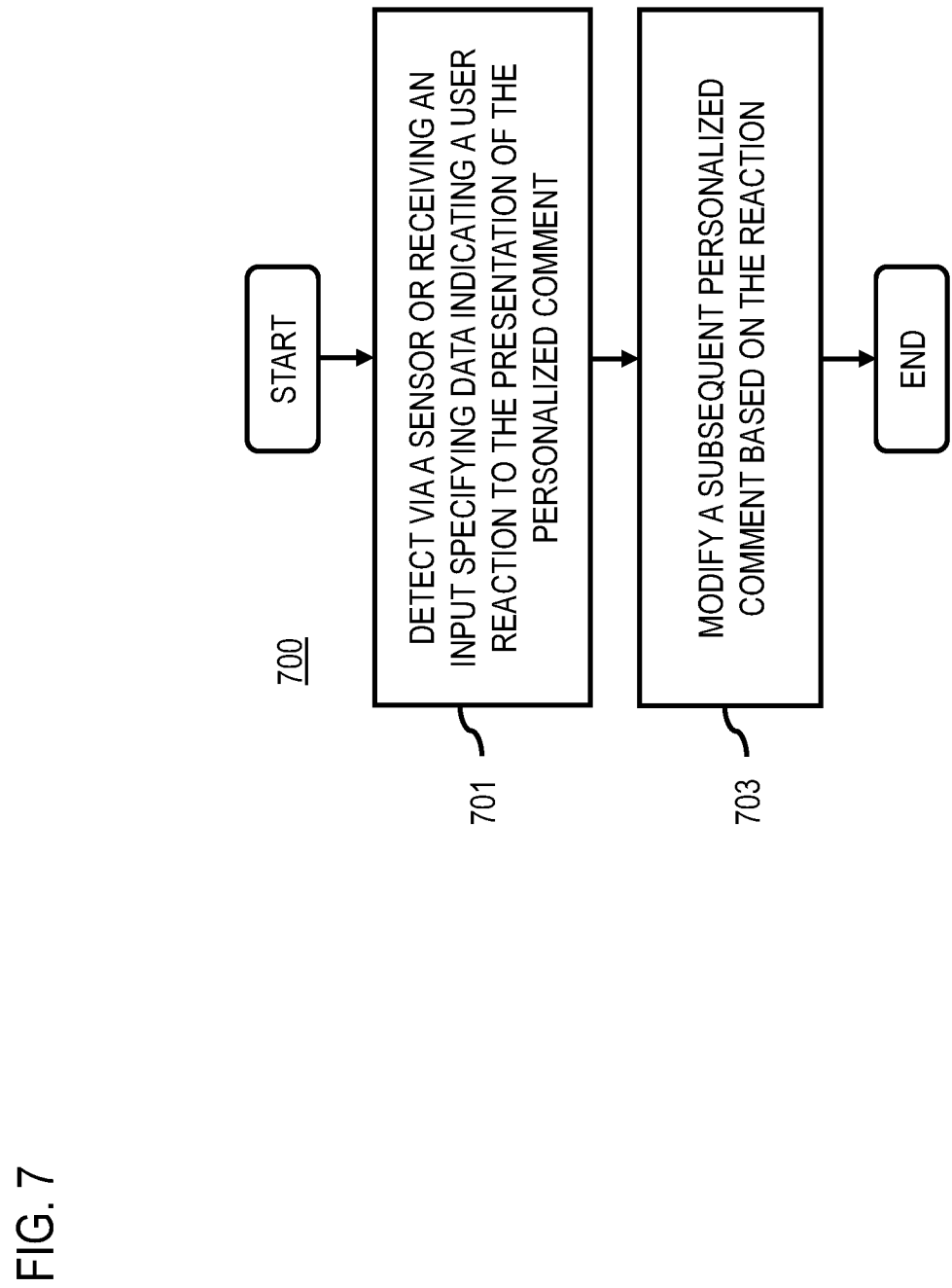
FIG. 7 is a flowchart of a process for modifying privacy-respectful and personalized location-based comments based on user reactions, according to one embodiment.

FIG. 7 is a flowchart of a process for modifying privacy-respectful and personalized location-based comments based on user reactions, according to one embodiment. In various embodiments, the presentation platform 107 and/or the modules 201-211 of the presentation platform 107 as shown in FIG. 2 may perform one or more portions of the process 700 and may be implemented in, for instance, a chip set including a processor and a memory as shown in FIG. 9. As such, the presentation platform 107 and/or the modules 201-211 can provide means for accomplishing various parts of the process 700, as well as means for accomplishing embodiments of other processes described herein in conjunction with other components of the system 100. Although the process 700 is illustrated and described as a sequence of steps, it is contemplated that various embodiments of the process 700 may be performed in any order or combination and need not include all of the illustrated steps.

In step 701, the presentation platform 107 detects via a sensor or receiving an input specifying data indicating a reaction of the user to the presentation of the personalized comment. The data indicating the reaction includes user survey data, feedback data extracted from user-generated content data, gaze-tracking data, heartrate data, perspiration data, eye movement data, body movement data, or a combination thereof. For example, the presentation platform 107 detects that the user emailed to Joe that the user just passed the place where Joe proposed his wife and asked how Joe is doing, immediately after hearing the comment: "In 100 m, you will arrive at the place where your friend Joe proposed his wife after 8 years together in 2009, click here to view the related photos and comments on social media."

In step 703, the presentation platform 107 modifies a subsequent personalized comment based on the data indicating the reaction, e.g., using a modified comment when passing the same location into: "Your friend Joe hasn't replied to your email sent last time you passed by the place Joe proposed his wife, click here to check on Joe at social media."

The computation of the different embodiments mentioned previously can be done partially or totally on servers/cloud, or at the edge of the network in order to balance the network load/cellular usage.

The above-discussed embodiments combine the location-based content with social networks or other personal data sets to generate relevant and personal comments considering the user's privacy.

The above-discussed embodiments determines a privacy level to present the most privacy-appropriate personal comment to the user under the user context, passenger context, vehicle context, environment context, etc. when traveling in a vehicle.

The above-discussed embodiments provide information regarding the personal data source to the user, so the user can better protect the user' privacy and personal data, and filter comments.

The above-discussed embodiments automatically modify the comments for future presentation.

The above-discussed embodiments lead to a higher acceptance of autonomous vehicles and their benefits.

The processes described herein for presenting privacy-respectful and personalized location-based comments based on passenger context and vehicle proximity to the location may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
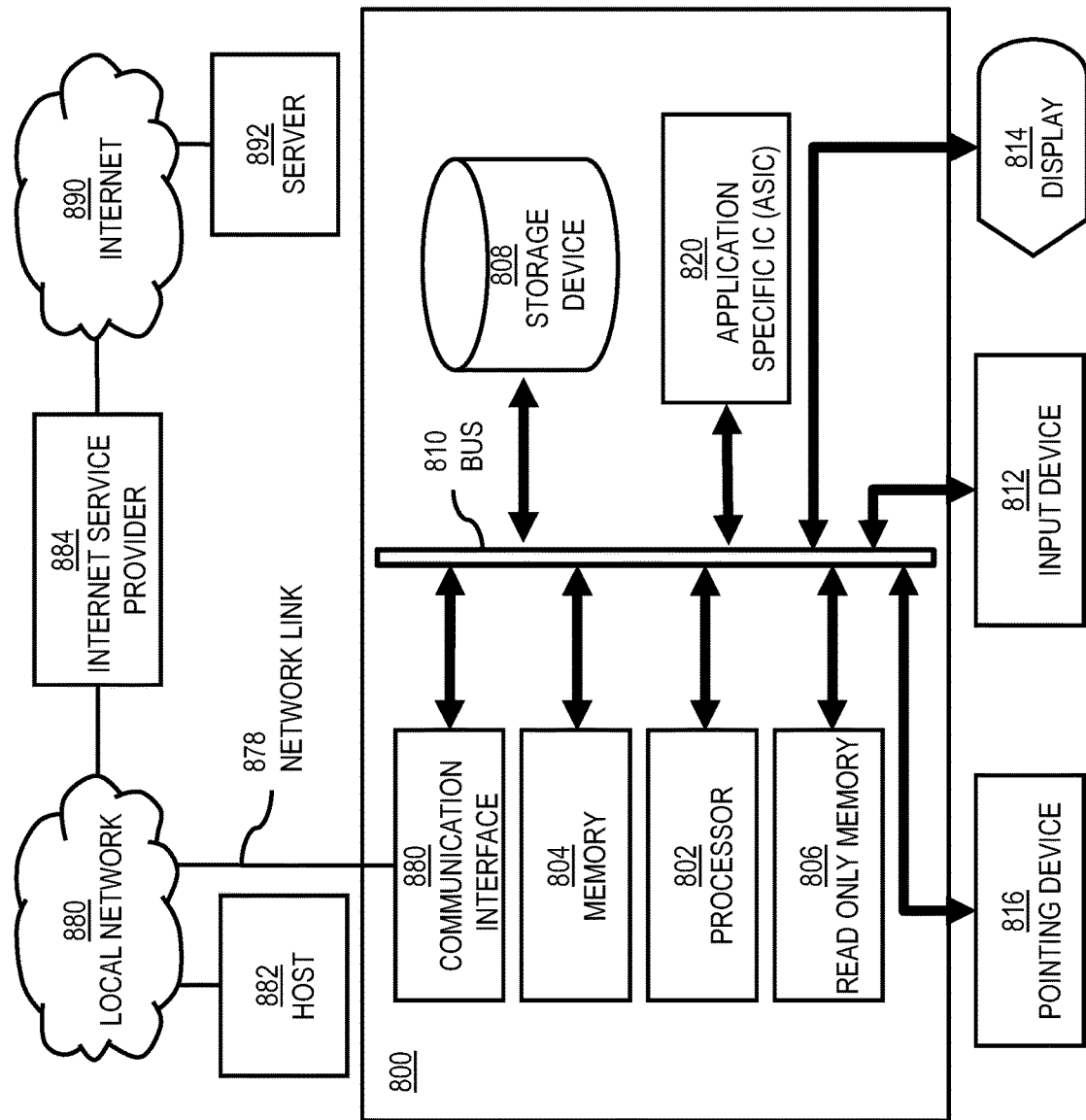
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to present privacy-respectful and personalized location-based comments based on passenger context and vehicle proximity to the location as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of presenting privacy-respectful and personalized location-based comments based on passenger context and vehicle proximity to the location.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to present privacy-respectful and personalized location-based comments based on passenger context and vehicle proximity to the location. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for presenting privacy-respectful and personalized location-based comments based on passenger context and vehicle proximity to the location. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for presenting privacy-respectful and personalized location-based comments based on passenger context and vehicle proximity to the location, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 880 coupled to bus 810. Communication interface 880 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 880 may be a parallel port or a serial port or a universal serial bus (USB) port on a personal computer. In some embodiments, communications interface 880 is an integrated services digital network (ISDN) card or a digital subscriber line (DSL) card or a telephone modem that provides an information communication connection to a corresponding type of telephone line. In some embodiments, a communication interface 880 is a cable modem that converts signals on bus 810 into signals for a communication connection over a coaxial cable or into optical signals for a communication connection over a fiber optic cable. As another example, communications interface 880 may be a local area network (LAN) card to provide a data communication connection to a compatible LAN, such as Ethernet. Wireless links may also be implemented. For wireless links, the communications interface 880 sends or receives or both sends and receives electrical, acoustic or electromagnetic signals, including infrared and optical signals, that carry information streams, such as digital data. For example, in wireless devices, such as mobile computers like vehicle infotainment system, the communications interface 880 includes a radio band electromagnetic transmitter and receiver called a radio transceiver. In certain embodiments, the communications interface 880 enables connection to the communication network 107 for presenting privacy-respectful and personalized location-based comments based on passenger context and vehicle proximity to the location to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 880, carry information to and from computer system 800. Computer system 800 can send and receive information, including program code, through the networks 880, 890 among others, through network link 878 and communications interface 880. In an example using the Internet 890, a server host 892 transmits program code for a particular application, requested by a message sent from computer 800, through Internet 890, ISP equipment 884, local network 880 and communications interface 880. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 880 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shared vehicle availability detection based on vehicle trajectory information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of presenting privacy-respectful and personalized location-based comments based on passenger context and vehicle proximity to the location.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide shared vehicle availability detection based on vehicle trajectory information. The memory 905 also stores the data associated with or generated by the execution of the inventive steps.

Figure 10:
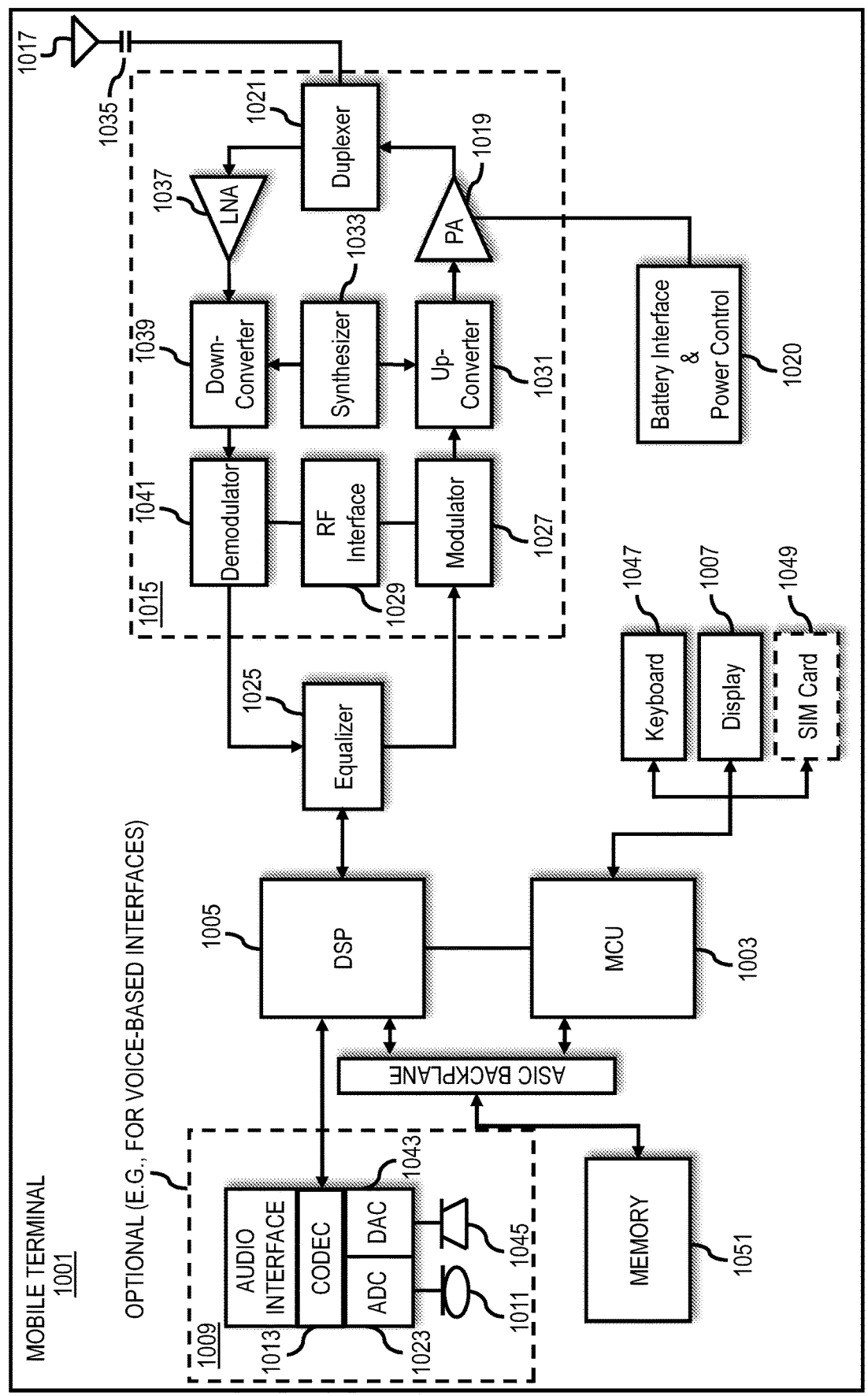
FIG. 10 is a diagram of a mobile terminal (e.g., mobile computer) that can be used to implement an embodiment of the invention.

FIG. 10 is a diagram of exemplary components of a mobile terminal (e.g., mobile computers such as vehicle infotainment system, vehicle embedded system, smartphones, etc.) for communications, which is capable of operating in the system of FIG. 1, according to one embodiment. In some embodiments, mobile terminal 1001, or a portion thereof, constitutes a means for performing one or more steps of presenting privacy-respectful and personalized location-based comments based on passenger context and vehicle proximity to the location. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a base-band integrated circuit or applications processor integrated circuit in a mobile computer or a similar integrated circuit in network device (e.g., a cellular network device or data other network devices).

Pertinent internal components of the mobile terminal include a Main Control Unit (MCU) 1003, a Digital Signal Processor (DSP) 1005, and a receiver/transmitter unit. In one embodiment, wherein voice-based interaction and/or communications are supported at the mobile terminal, the mobile terminal may also include a microphone gain control unit and a speaker gain control unit. A main display unit 1007 provides a display to the user in support of various applications and mobile terminal functions that perform or support the steps of presenting privacy-respectful and personalized location-based comments based on passenger context and vehicle proximity to the location. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. In embodiments supporting voice-based interactions and/or communications, an audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station (e.g., data and/or voice communications), which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, data to support presenting privacy-respectful and personalized location-based comments based on passenger context and vehicle proximity to the location is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission through the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing shared vehicle availability detection. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide shared vehicle availability detection based on vehicle trajectory information. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details (e.g., data and/or voice subscriptions), and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method, comprising:
   identifying a user of a vehicle, a location of the vehicle, a context of the vehicle, or a combination thereof;
   determining a privacy level set by the user associated with the context of the vehicle;
   generating a current personalized comment specifying one or more activities of the user, of one or more contacts of the user, of one or more entities that are followed by social media, bookmarked, forwarded, liked, or posted by the user online, or a combination thereof occurred at the location based on the privacy level, wherein the personalized comment includes privacy-sensitive data associated with the user; and
   triggering a presentation of the personalized comment in a user interface of the vehicle, a device inside the vehicle, or a combination thereof based on a proximity of the vehicle to the location.

2. The method of claim 1, further comprising:
   querying a database for the privacy-sensitive data based on the location of the vehicle and the privacy level,
   wherein the personalized comment further specifies one or more prompts for the user to access addition information associated with the one or more activities, the one or more contacts, the one or more entities, or a combination thereof.

3. The method of claim 2, wherein the database includes a plurality of personalized privacy-sensitive spatial data records associated with the user, the one or more contacts of the user, the one or more entities, or a combination thereof, and wherein the plurality of personalized privacy-sensitive spatial data records is classified according to a plurality of predetermined privacy levels, and
   wherein the personalized comment further specifies at least one identification of the user, at least one identification of the one or more contacts, at least one identification of the one or more entities, timing of the one or more activities, or a combination thereof.

4. The method of claim 2, further comprising:
   parsing a plurality of location-tagged data records from one or more online data sources, one or more offline data sources, or a combination thereof associated with the user to generate the personalized privacy-sensitive spatial data records,
   wherein the personalized comment further specifies one or more prompts for the user to communicate with the one or more contacts, the one or more entities, or a combination thereof.

5. The method of claim 4, further comprising:
   establishing at least one communication link to the one or more contacts, the one or more entities, or a combination thereof, in response to a user selection of the one or more prompts to communicate,
   wherein the one or more online data sources, the one or more offline data sources, or a combination thereof include a family tree, a photo library, a history of online and offline purchases, a history of consumed media, a contact history, medical data, or a combination thereof associated with the user.

6. The method of claim 1, wherein the context of the vehicle includes a detected presence of another passenger in the vehicle, and wherein the determining of the privacy level is further based on the detected presence of the another passenger.

7. The method of claim 1, wherein the triggering of the presentation of the personalized comment is based on comparing the personalized comment to a database of previously presented comments.

8. The method of claim 7, wherein the comparing of the personalized comment includes determining a time at which a matching previously presented comment was presented to the user, and wherein the presentation of the personalized comment is triggered based on determining that the time is not within a designated most recent time period.

9. The method of claim 1, further comprising:
   detecting via a sensor or receiving an input specifying data indicating a reaction of the user to the presentation of the personalized comment; and
   modifying a subsequent personalized comment based on the data indicating the reaction.

10. The method of claim 9, further comprising:
    analyzing the data indicating the reaction to determine a user relevancy factor, a user interest factor, or a combination thereof,
    wherein the modifying of the subsequent personalized comment is further based on the user relevancy factor, the user interest factor, or a combination thereof.

11. The method of claim 9, wherein the data indicating the reaction includes user survey data, feedback data extracted from user-generated content data, gaze-tracking data, heart-rate data, perspiration data, eye movement data, body movement data, or a combination thereof,
    wherein the one or more entities are followed by the user on social media, and
    wherein the presentation of the personalized comment triggering by an apparatus without user intervention.

12. The method of claim 1, wherein the privacy-sensitive data include a physical attribute, a physiological attribute, a mental attribute, an economic attribute, a cultural attribute, a social identity attribute, or a combination thereof of the user, of the one or more contacts, of the one or more entities, or a combination thereof.

13. A computer-implemented method, comprising:
    identifying a user of a vehicle, a location of the vehicle, a context of the vehicle, or a combination thereof;
    determining a privacy level set by the user associated with the context of the vehicle and context of the user;
    generating a personalized comment specifying one or more activities of the user, of one or more contacts of the user, of one or more entities that are followed by social media, bookmarked, forwarded, liked, or posted by the user online, or a combination thereof occurred at the location based on the privacy level, wherein the personalized comment includes privacy-sensitive data associated with the user; and triggering a presentation of the personalized comment in a user interface of the vehicle, a device inside the vehicle, or a combination thereof based on a proximity of the vehicle to the location, wherein the context of the user includes a user familiarity with the location determined based on a number of detected visits by the user to the location, and wherein the privacy level, the personalized comment, or a combination thereof is based on user familiarity with another passenger in the vehicle.

14. An apparatus comprising:
at least one processor; and
at least one memory including computer program code for one or more programs,
the at least one memory and the computer program code configured to, with the at least one processor, cause the apparatus to perform at least the following:
identify a user of a vehicle, a location of the vehicle, a context of the vehicle, or a combination thereof;
determine a privacy level set by the user associated with the context of the vehicle;
generate a current personalized comment specifying one or more activities of the user, of one or more contacts of the user, of one or more entities that are followed by social media, bookmarked, forwarded, liked, or posted by the user online, or a combination thereof occurred at the location based on the privacy level, wherein the personalized comment includes privacy-sensitive data associated with the user; and
trigger a presentation of the personalized comment in a user interface of the vehicle, a device inside the vehicle, or a combination thereof based on a proximity of the vehicle to the location.

15. The apparatus of claim 14, wherein the apparatus is further caused to:
query a database for the privacy-sensitive data based on the location of the vehicle and the privacy level.

16. The apparatus of claim 15, wherein the database includes a plurality of personalized privacy-sensitive spatial data records associated with the user, the one or more contacts of the user, the one or more entities, or a combination thereof, and wherein the plurality of personalized privacy-sensitive spatial data records is classified according to a plurality of predetermined privacy levels.

17. The apparatus of claim 15, wherein the apparatus is further caused to:
parse a plurality of location-tagged data records from one or more online data sources, one or more offline data sources, or a combination thereof associated with the user to generate the personalized privacy-sensitive spatial data records.

18. A non-transitory computer-readable storage medium for generating vulnerable road user data for a geographic database, carrying one or more sequences of one or more instructions which, when executed by one or more processors, cause an apparatus to perform:
identifying a user of a vehicle, a location of the vehicle, a context of the vehicle, or a combination thereof;
determining a privacy level set by the user associated with the context of the vehicle;
generating a current personalized comment specifying one or more activities of the user, of one or more contacts of the user, of one or more entities that are followed by social media, bookmarked, forwarded, liked, or posted by the user online, or a combination thereof occurred at the location based on the privacy level, wherein the personalized comment includes privacy-sensitive data associated with the user; and
triggering a presentation of the personalized comment in a user interface of the vehicle, a device inside the vehicle, or a combination thereof based on a proximity of the vehicle to the location.

19. The non-transitory computer-readable storage medium of claim 18, wherein the apparatus is further caused to perform:
querying a database for the privacy-sensitive data based on the location of the vehicle and the privacy level.

20. The non-transitory computer-readable storage medium of claim 19, wherein the database includes a plurality of personalized privacy-sensitive spatial data records associated with the user, the one or more contacts of the user, the one or more entities, or a combination thereof, and wherein the plurality of personalized privacy-sensitive spatial data records is classified according to a plurality of predetermined privacy levels.

* * * * *